United States Patent [19]

Makino et al.

[11] Patent Number: 6,066,263

[45] Date of Patent: *May 23, 2000

[54] APPARATUS FOR CONVERTING WASTE PLASTIC INTO OIL

[75] Inventors: Hisaaki Makino; Takehiko Moriya; Yoshihisa Saito, all of Miyagi-ken; Masazumi Kanazawa, Kochi-ken, all of Japan

[73] Assignees: Tohoku Electric Power Company, Inc., Miyagi-Ken; Ohei Developmental Industries, Co., Inc., Kochi-ken, both of Japan

[*] Notice: This patent is subject to a terminal disclaimer.

[21] Appl. No.: 09/041,499

[22] Filed: Mar. 12, 1998

Related U.S. Application Data

[63] Continuation-in-part of application No. 08/631,812, Apr. 10, 1996, Pat. No. 5,843,386.

[30] Foreign Application Priority Data

Apr. 20, 1995 [JP] Japan ........................................ 7-95002
Mar. 29, 1996 [JP] Japan ........................................ 8-76936

[51] Int. Cl.⁷ ........................................................ B01J 3/00
[52] U.S. Cl. .......................... 210/774; 210/177; 210/178; 210/195.1; 210/205; 210/259; 422/203; 422/234; 422/242
[58] Field of Search .................................... 210/136, 137, 210/149, 177, 178, 195.1, 205, 259, 741, 774; 422/202, 203, 234, 242

[56] References Cited

U.S. PATENT DOCUMENTS

| | | | |
|---|---|---|---|
| 3,945,810 | 3/1976 | Saito ........................................... | 48/76 |
| 4,053,404 | 10/1977 | Van Kirk ................................... | 210/63 |
| 4,217,218 | 8/1980 | Bauer ....................................... | 210/63 |
| 4,272,383 | 6/1981 | McGrew .................................. | 210/741 |
| 4,338,199 | 7/1982 | Modell ..................................... | 210/721 |
| 4,721,575 | 1/1988 | Binning et al. .......................... | 210/761 |
| 4,774,006 | 9/1988 | Kaufmann ............................... | 210/742 |
| 4,882,497 | 11/1989 | Inooue et al. ........................... | 250/560 |
| 5,054,108 | 10/1991 | Gustin et al. ........................... | 392/492 |
| 5,128,515 | 7/1992 | Tanaka .................................... | 219/390 |
| 5,133,877 | 7/1992 | Rofer et al. ............................. | 210/761 |
| 5,192,453 | 3/1993 | Keckler et al. ......................... | 210/761 |
| 5,372,725 | 12/1994 | Halff et al. .............................. | 210/761 |
| 5,401,140 | 3/1995 | Anderson ................................. | 417/63 |
| 5,431,889 | 7/1995 | Huang et al. ........................... | 422/198 |
| 5,597,451 | 1/1997 | Nagai et al. ............................. | 201/4 |
| 5,856,599 | 1/1999 | Kuroki .................................... | 585/241 |

FOREIGN PATENT DOCUMENTS 5177188 7/1993 Japan .

*Primary Examiner*—David A. Simmons
*Assistant Examiner*—Betsey J. Morrison
*Attorney, Agent, or Firm*—Wolf, Greenfield & Sacks, P.C.

[57] ABSTRACT

A safe and efficient hydrothermal reaction apparatus for converting waste plastic into oil is described herein. The apparatus comprises a receiver tank for containing therein a mixture of plastic and water; a high-pressure injection pump in communication with the receiver tank through a flow passage change-over valve, the flow passage change-over valve being in communication with a water injection passage; a reactor device including a curved piping in communication with the injection pump, the curved piping being provided with a heating means; and an effluent tank in communication with the reactor device through a pressure reducing valve. The flow rate of the mixture injected into the reaction device may be controlled by regulating the pressure reducing valve. Thermal decomposition of the mixture is performed in the reactor device under pressure and temperature conditions equal to, or above, a value by which a supercritical condition of water is achieved, and under the turbulent flow conditions generated partly by the curved piping.

9 Claims, 14 Drawing Sheets

APPARATUS FOR CONVERTING WASTE PLASTIC INTO OIL

RELATED APPLICATIONS

This application is a continuation-in-part of U.S. patent application Ser. No. 08/631,812, filed on Apr. 10, 1996, now U.S. Pat. No. 5,843,386, issued on Dec. 1, 1998, entitled HIGH PRESSURE TREATMENT APPARATUS, the disclosure of which is incorporated herein by reference.

BACKGROUND OF THE INVENTION

1. Field of the Invention

This invention relates to an apparatus for decomposing waste plastic materials, such as cable sheathings, through a supercritical water reaction, so as to obtain oily materials from the reaction products.

2. Description of the Prior Art

A hydrothermal reaction in which high temperature, high pressure water and raw material are contacted and mixed with each other, or a supercritical fluid reaction in which a high temperature, high pressure supercritical fluid is used as a solvent is conventionally used in order to perform decomposition of various waste materials, synthesis of organic and inorganic compounds, production of particulates, and reaction between particulates. Raw materials to be treated include coal, heavy oil, rubber, waste plastic, excrement, PCB (polychlorobiphenyl). It is also proposed that particulates may be produced through a chemical reaction. It is noted, however, that such proposals are based on a laboratory scale. Thus, it is highly desired that a continuous treatment apparatus in a practical size be embodied which is indispensable to treatment of a large amount of raw material and industrialization.

A typical high-pressure treatment apparatus in prior art is described in Japanese Patent Publication No. 5-177188 (KOKAI HE15-177188). In this apparatus, material to be decomposed (object material) such as PCB, water or hydrothermal solvent, and reaction accelerator are contained in a decomposition reactor (autoclave) and then decomposed under a high temperature/high pressure condition. The above apparatus is of a batch type. Such apparatus includes, as shown in FIG. 1, a decomposition reactor (autoclave) 1. The decomposition reactor 1 includes a nitrogen gas cylinder 3 as pressure gas supply means, a pressure means 2 consisting of the nitrogen gas cylinder 3, and a heating means 4 such as electric heaters. Material to be decomposed (object material), water or hydrothermal solvent (solvent) 11 and reaction accelerator 12 in a given ratio are supplied to the decomposition reactor 1 through pipings 5, 6, 7 and pumps 8, 9, 10. The internal pressure within the decomposition reactor 1 is increased by means of the pressure means 2. Thereafter, the temperature in the reactor is adjusted at a selected value by means of the heating means 4. The object material is decomposed by maintaining the reactor at a high temperature/high pressure condition for a predetermined period of time. Then, the temperature in the reactor is decreased by de-energizing the heating means, while the internal pressure is decreased by opening a blow-off valve of the reactor. Then, a valve 14 of a decomposed liquid discharge means 13 is opened, and the reactor is pressurized by means of the pressure means 2, whereby a decomposed liquid is discharged into a decomposed liquid discharge tank 16. When solid materials are contained in the decomposed liquid, they are removed by means of a filter 17. If it is intended for the apparatus to be operated in a continuous manner, raw liquid or feed liquid should be continuously supplied to the reactor 1 and decomposed liquid should be continuously discharged from the reactor in order to maintain liquid level in the reactor at a predetermined value. It is noted, however, that, in such a case, the decomposed liquid essentially contains therein a portion of the raw liquid when it is discharged from the reactor. Thus, only insufficient treatment is expected when such prior art apparatus is operated in a continuous manner.

Japanese Patent Public Disclosure No. 4-2844886 (KOKAI HE15-284886) proposed a system in which feed material is supplied by means of a high-pressure injection pump into a vertical reaction tower consisting of straight pipes for continuous treatment thereof. In this system, water in a water tank 20 and feed material in a feed liquid tank 18 are displaced by means of a compressor 19 through a piping 21 into a reaction tower 29 consisting of a straight pipe (reaction pipe 30A) of a high pressure-resistance having heating means thereon 30, as shown in FIG. 2. Before reaching the reaction tower 29, the water and the feed material are admixed (dilution of the feed material) by connecting pipings 22 and 23, and introduced through a piping 24 into a heat exchanger 28 having a high-pressure injection pipe 25, piping 26 and piping 27. Treated liquid is discharged from piping 30B connected to the outlet port of the reaction tower through the heat exchanger 28, a cooler 30C and a pressure reducing valve 30D. In this continuously treating apparatus, various pipings, i.e., the piping for feeding the material to be decomposed (object material), the piping for supplying reaction accelerator, the heat-exchanging pipings disposed to upstream and downstream of the reaction tower, the vertical straight piping within the reaction tower, and the piping for discharging the treated liquid are employed. Thus, the entire flow passage is very complicated, though reactant liquid (liquid to be reacted) may flow through the straight piping within the reaction tower simply in the vertical direction.

In order to perform decomposition by means of a supercritical water reaction in a stable and efficient manner, it is necessary for object material to be treated and water to be sufficiently admixed and contact with each other and such well admixed and contacted condition should be maintained. It is also necessary for reaction temperature, pressure and treatment capacity (flow rate) of reactant material to be kept at a constant value or to be adjustably controlled. Take, for example, the case of decomposing high-molecular weight compounds such as waste plastics. The rate of their decomposition which is started by the supply of sufficient thermal energy is so slower at temperatures below the supercritical level than at the supercritical temperature that they take unduly prolonged time, which is undesirable from a practical viewpoint since the throughput of the decomposing apparatus is very low. Hence, the reaction temperature must be at least equal to the supercritical level. It has recently been proposed to lower the decomposition temperature as by adding an oxidizer or other decomposition accelerators but this idea also is not satisfactory from a practical viewpoint since the decomposition accelerator will not only corrode the apparatus but also add to the operating cost. On the other hand, at the supercritical temperature and above, there is no need to use any decomposition accelerator and yet the high-molecular weight compounds can be decomposed within a few minutes.

Supercritical water will undergo considerable changes in physicochemical properties with varying pressure and below the supercritical pressure, the supercritical water will not be able to form a homogeneous phase with the decomposed oil which is the product of decomposition and no efficient reaction site is available to ensure a homogeneous reaction which is indispensable to the progress of consistent decomposition. Specifically, the decomposition reaction by means of a supercritical water reaction may be facilitated and increased in its efficiency by severely contacting object material and water with each other. If object material and water are admixed and contacted insufficiently, reaction efficiency becomes very low, so that intended treatment is not achieved, whereby such process could not be used practically.

When the object material to be decomposed is solid or powder, it is not completely decomposed under a certain treatment condition, thus remaining in the form of solid or powder. When water and solid are not sufficiently admixed, such water and solid or powder are separated into two phases or layers. Thus, heterogeneous field is created within the apparatus, so that stable reaction is not expected. Even when the object material is liquid, efficient reaction would not be expected, if the object material, solvent and reaction accelerator are not sufficiently admixed and pass through the reactor in separate form. When by-product in powder form is generated during decomposition process, there is no problem if such powder and fluid are evenly admixed and transported smoothly. It is noted, however, that problems may be caused if there is difference in moving velocity between power and fluid. Such problems may include blockage in the reaction system due to coagulation of powder therein or blockage in a pressure reducing valve due to passage of massive powder therethrough.

If the above prior art technique could be practically used, it is impossible to perform certain operation such as agitation within a large-sized reactor vessel of a batch type. Thus, it is not expected for water and object material to be decomposed to be sufficiently admixed. When decomposed liquid contains solids therein, it is necessary for the decomposed liquid and solids to be extracted from the reactor vessel for removing such solids by means of a filter. It is noted, however, that it is practically difficult to securely extract decomposed liquid and solids from the reactor vessel at high-temperature and high-pressure and to stably perform filtration operation by means of a filter under high-pressure condition.

Another problem relating to the batch type high-pressure treatment is operational problem included when setting reaction time, reaction temperature, treatment capacity (flow rate) and the like. With the batch type treatment, operational condition depends upon a given reactor vessel, so that a wide variety of operational condition could not be selected. For example, a temperature gradient within the reactor vessel is required to be variously controlled in accordance with a given material to be treated. It is noted, however, that, with the batch type treatment, the temperature gradient could not be variously controlled.

Polyethylene, frequently used as cable sheathings, may be very quickly decomposed in a supercritical water at about 500° C. into low molecular compounds such as straight chain hydrocarbons, such as paraffin and olefin, and aromatic compounds and the mixtures thereof.

Paraffinic hydrocarbons are a class of straight-chained hydrocarbons that do not have any unsaturated bonds in the molecule and they may be represented as follows:

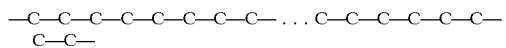

A paraffinic hydrocarbon having two carbon atoms is called ethane ($C_2H_6$; gas), depending upon the number of carbon atoms they have, paraffinic hydrocarbons are respectively called propane ($C_4H_{10}$; gas), n-hexane ($C_6H_{14}$; liquid); n-octane ($C_8H_{18}$; liquid) and n-decane ($C_{10}H_{22}$; liquid); a compound having 20 carbon atoms is called n-eicosane ($C_{20}H_{42}$; solid).

The longer the carbon chain, the higher the boiling point and the more fluid at ordinary temperatures. Therefore, decomposed oils containing more of the paraffinic hydrocarbons having a longer carbon chain are comparable to heavy oils whereas those which have a shorter carbon chain contain more of the gasoline and gaseous components.

Olefinic hydrocarbons are a class of straight-chained hydrocarbons that have unsaturated bonds in the molecule and they may be represented as follows:

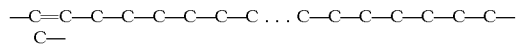

An olefinic hydrocarbon having two carbon atoms is called ethylene ($C_2H_4$; gas); depending on the number of carbon atoms they have, olefinic hydrocarbons are respectively called propene ($C_4H_8$; gas), n-hexene ($C_6H_{10}$; liquid), n-octene ($C_8H_{16}$; liquid) and n-decene ($C_{10}H_{22}$; liquid); a compound having 20 carbon atoms is called n-eicosene ($C_{20}H_{40}$; solid). The above compounds such as paraffinic hydrocarbons and olefinic hydrocarbons may be modified into aromatic compounds by controlling temperature of such supercritical water and treatment time. In order to perform continuous decomposition of polyethylene at high speed and subsequent, continuous modification reaction process, it is necessary to continuously and selectively control reaction temperature and treatment time, to change the temperature at an appropriate time, and to selectively control the reaction. In order to permit various object materials to be decomposed, other than polyethylene, a supercritical water reaction should be realized in which treatment condition such as treatment time and temperature control may be variously changed.

In the above-mentioned continuous treatment process, the straight pipe of the reaction tower may have an inner diameter of about 20 mm and an entire length of about 2,890 mm, as exemplified in the prior art documents, and thus its volume is strictly restricted. Thus, it is difficult to variously select treatment capacity (flow rate) and reaction time. If the straight pipe is increased in its diameter in order to obtain higher treatment capacity, heat capacity of such pipe will be disadvantageously increased in proportion to its increased volume. Thus, it is difficult to obtain efficient heating and preservation of temperature. If the reaction tower is increased in its height, it is also difficult to preserve reaction temperature and temperature gradient.

The reaction apparatus is operated at high-pressure and high-temperature, so that it is very dangerous if any damage is caused thereto. In particular, any troubles leading to burst-out of liquid to be decomposed during treatment should be avoided. Connection portions or connectors requiring seal material which may invite such troubles should be obviated. In the above-mentioned high-pressure treatment apparatus, the reactor tower/reactor vessel includes high pressure piping which is different to the inflow piping for the material to be treated. This means that there is difference in inner diameter between the inflow piping for the material to be treated and the reaction tower or reactor vessel and the outflow piping. This causes change in flow velocity and intermittent flow within the flow line. By this, it is difficult to analyze or determine the phase of each of the hydrothermal solvent and the object material to be decomposed within the reactor tower or reactor vessel. This makes it difficult to appropriately design the apparatus.

This invention provides an apparatus for converting waste plastic into oil, utilizing decomposition reaction by means of a supercritical water reaction, which may be operated in a safe manner, and which ensures object material to be decomposed and water to be sufficiently and evenly admixed so as to obtain a continuous flow, while facilitating selective setting and preservation of reaction condition such as reaction time, reaction temperature, temperature gradient, flow rate and pressure, thus enabling stable reaction process.

SUMMARY OF THE INVENTION

The invention is featured by providing an apparatus for converting waste plastic into oil which comprises a receiver tank for containing therein a mixture of plastic and water; a high-pressure injection pump in communication with the receiver tank through a flow passage change-over valve, the flow passage change-over valve being in communication with a water injection passage; a reactor device including a curved piping in communication with the injection pump, the curved piping being provided with a heating means; and an efficient tank in communication with the reactor device through a pressure reducing valve, wherein the mixture is injected into the reactor device by means of the injection pump, wherein the flow rate of the mixture to be injected into the reaction device may be controlled by regulating the pressure reducing valve, and wherein thermal decomposition of the mixture is performed in the reactor device, characterized in that: the flow passage change-over valve is communicated with the water injection passage, so as to allow a flow of water to be injected into the reactor device, while maintaining the pressure of the water at or above a value by which a supercritical condition is achieved; the water is heated, by means of the reactor device, to a temperature equal to or above a value by which a supercritical condition is achieved; then, the container tank and the high-pressure injection pump are communicated with each other by appropriately changing the flow passage change-over valve; the mixture is injected into the reactor device, while maintaining a pressure condition by which a supercritical condition of the water is achieved; the water is heated, by means of the reactor device, to a temperature equal to or above a value by which a supercritical condition of the water is achieved; the mixture is flown, under a turbulent condition, into the piping by regulating the pressure reducing valve, so as to cause the plastic to be decomposed; and the resultant reaction product is discharged through the pressure reducing valve into the effluent tank, for the collection of gaseous materials, oily materials and water.

The invention is also featured by providing an apparatus for converting waste plastic into oil which comprises: an object liquid receiver tank for containing therein a mixture of plastic and water; a high-pressure injection pump in communication with the receiver tank through a flow passage change-over valve, the flow passage change-over valve being in communication with a water injection passage; a preheater including a curved piping in communication with the high-pressure injection pump; a reactor device including a quick heating means and a warmer means having a curved piping; and an effluent tank in communication with the reactor device through a pressure reducing valve, wherein the mixture is injected into the reactor device by means of the high-pressure injection pump; wherein the flow rate of the mixture to be injected is controlled by regulating the pressure regulating valve; and wherein thermal decomposition of the mixture is performed in the reaction device, characterized in that: the flow passage change-over valve is communicated with the water injection passage, so as to cause the water to be injected into the reactor device, while maintaining the water at a pressure equal to or above a value by which a supercritical condition is achieved; the water is heated, by means of the pre-heater, to a temperature around a value by which a supercritical condition of the water is achieved; the water is quickly heated, by means of the quick heating means, to a temperature equal to or above a value by which a supercritical condition is achieved; the water is maintained at the temperature by means of the warmer means; the receiver tank and the high-pressure injection pump are communicated with each other by appropriately changing the flow passage change-over valve; the mixture is injected into the reactor device, while maintaining the mixture at a pressure equal to or above a value by which a supercritical condition of the water is achieved; the mixture having been injected into the reactor device, like the injected water, is preheated, by means of the preheating means, the quick heating means and the warmer means, to a temperature around a value by which a supercritical condition is achieved; the mixture is quickly heated to a temperature equal to or above a value by which a supercritical condition is achieved; the mixture is maintained at the temperature by means of the warmer means; the mixture is flown, under a turbulent condition, into the piping by regulating the pressure reducing valve, so as to cause the plastic to be decomposed; and the resultant reaction product is discharged through the pressure reducing valve into the effluent tank, for the collection of gaseous materials, oily materials and water.

The above-mentioned mixture of plastic and water may be a slurry consisting of plastic powder and water. The mixture of plastic and water may be a mixture of melt plastic and water. The apparatus of the invention is featured by comprising a receiver tank having a heating means for holding melt plastic therein, and a receiver tank for containing water therein, wherein the receiver are in communication with the reactor device through a high-pressure injection pump. The above-mentioned preheater, warmer or reactor device including a curved piping is featured by comprising a plurality of reactor units connected to one another, the reactor units including unified heating means which may be controlled independently relative to one another. The above-mentioned quick heating means may be an induction heater disposed in a piping by which the preheater and the warmer means are communicated with each other.

Operation

In accordance with the apparatus for converting waste plastic into oil of the invention, a flow passage included in a reactor unit is formed by a curved piping. High-pressure lines upstream and downstream of the piping may be formed by pipings of substantially the same inner diameter. A feed fluid to be treated, which is a mixture consisting of plastic as an object material to be decomposed and water, is easily regulated to be in a turbulent flow region. It is possible for the feed material to be maintained in an appropriately and sufficiently mixed condition throughout the entire system whereby stable reaction is realized. The reactor unit is formed in a spiral configuration, so that an increased treatment capacity is obtained in relation to the required space. Reaction time may be selectively set at a desired value by controlling flow rate.

The reaction portion is constituted by a unified piping wound in a spiral configuration and disposed around or within the hot plate block. A plurality of such reaction portions is disposed. Thus, each of the units may be independently controlled in its temperature. A temperature gradient is precisely controlled. Water may be injected at an intermediate portion of the multi-staged reaction portions, so that different reaction condition may be obtained in each of the first and second reaction portions.

The high-pressure line of the apparatus is constituted by pipings of substantially the same inner diameter. Thus, connection parts requiring seal may be minimized. Breakage of seal is minimized, so that extremely stable or reliable apparatus may be provided.

BRIEF DESCRIPTION OF THE DRAWINGS

FIG. 8a is a top plan view illustrating one example of circular piping unified with a circular hot plate block;

FIG. 12-C is a graph showing variation in constituent of oil materials depending upon the types of plastics to be treated;

BRIEF DESCRIPTION OF THE PREFERRED EMBODIMENTS

Figure 1:
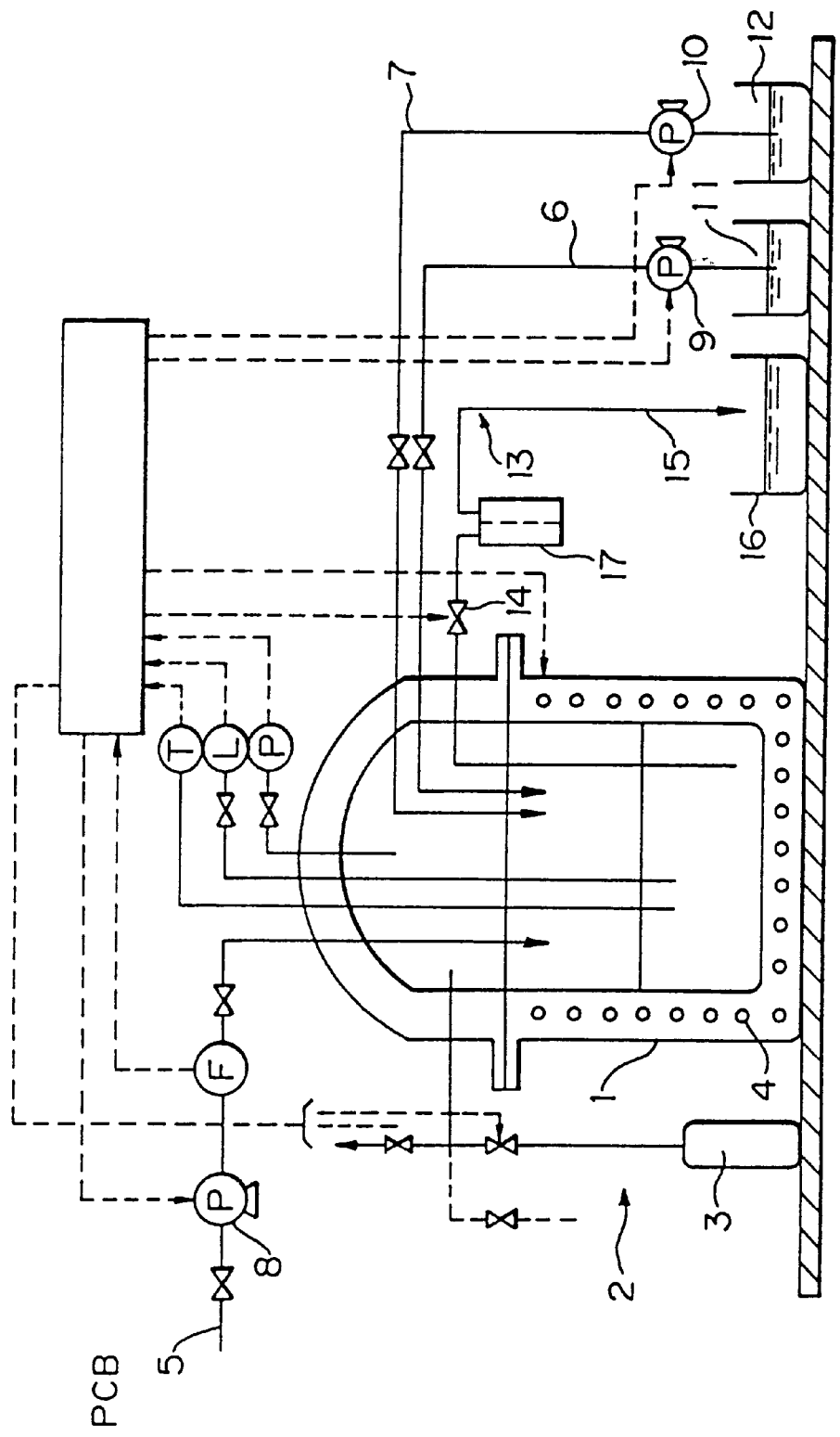
FIG. 1 is a diagrammatic view illustrating an example of a batch type treatment apparatus in prior art.
Figure 2:
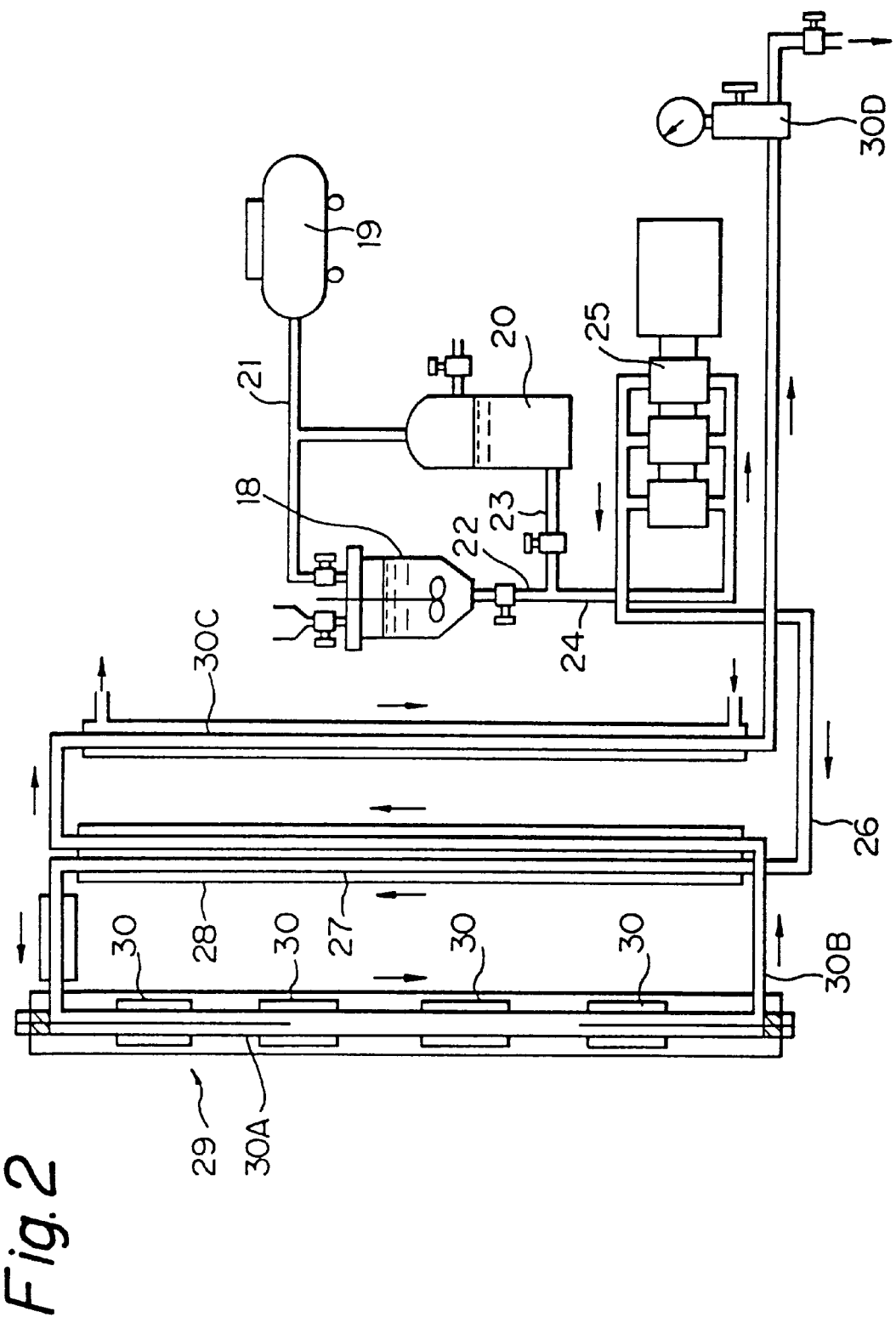
FIG. 2 is a diagrammatic view illustrating an example of a continuous treatment apparatus in prior art.
Figure 3:
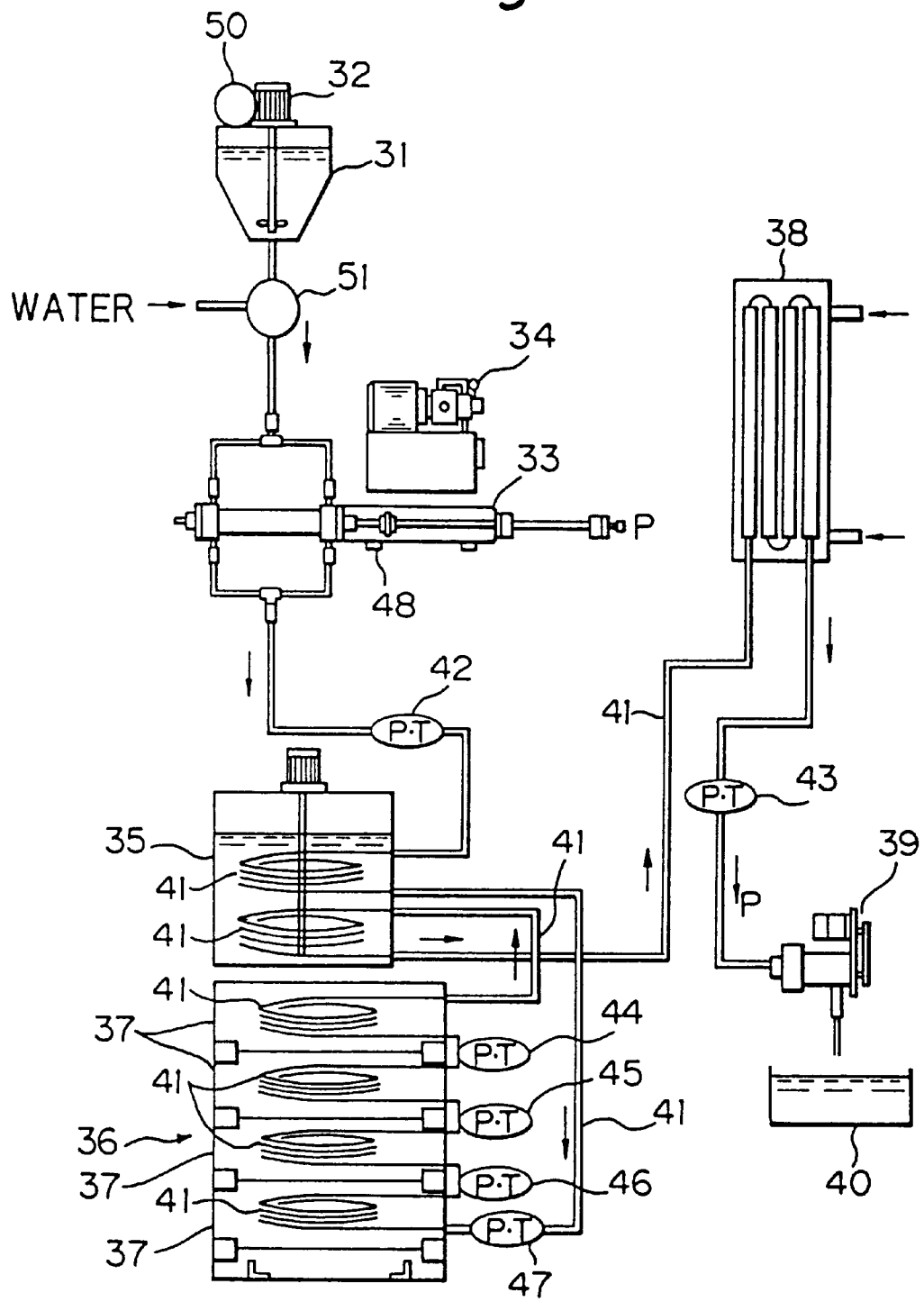
FIG. 3 is an exemplary view illustrating a high-pressure treatment apparatus according to the invention.

FIG. 3 is an illustrative view showing one example of the apparatuses according to the invention. Reference number 31 denotes a tank having agitation means for a liquid to be treated in which a mixture of plastic and water is contained. Reference number 33 designates a high-pressure pump, 34 a hydraulic unit, 35 a heat exchanger, and 36 a reactor consisting of a multi-staged (4 stages in the drawing) reactor unit 37. Reference numeral 38 denotes a cooler, 39 a pressure reducing valve, 40 a tank for receiving reaction product, and 51 a change-over valve for selectively changing the flow passage between a water injection passage and the tank 31. The heat exchanger 35, the reaction device 36 and the cooler 39 include respective spiral or curved pipings 41 of the same diameter and connected relative to one another by means of respective pipings of the same diameter.

Since the above pipings have the same diameter, the pressure within such pipings can be regarded as the same value even when it is measured at any point of the pipings from the high-pressure pump 33 through to the pressure regulating valve 39. It is noted, however, that, in the drawing, the pressure within the pipings is measured at point 42 between the high-pressure injection pump 33 and the heat exchanger 35, at a point 43 between the cooler 38 and the pressure regulating valve 43, and at points 44, 45, 46 and 47 within the reactor unit 37. Temperature of the fluid in the piping within the reactor (reaction temperature) is detected by the temperature/pressure detectors disposed at the positions 42, 43, 44, 45, 46 and 47 at which the above pressure detection is performed. Displacement of the cylinder pump is continuously detected by means of a rotary encoder 48 so as to determine flow rate. Such continuously detected output signals are all transmitted to a control computer and a control panel for indication thereof. Each portion is automatically controlled by the control computer so as to maintain a respective set condition. The object liquid tank 31 is provided with a volume sensor or a liquid lever sensor 50 so as to confirm volume of the liquid remaining in the tank. A various kind of meter such as an ultrasonic lever sensor may be used as a volume sensor. The flow rate, injection pressure and temperature control, together with start and stop operation of each of the reactor unit 38 may be controlled by means of the control panel and the control computer.

Figure 4:
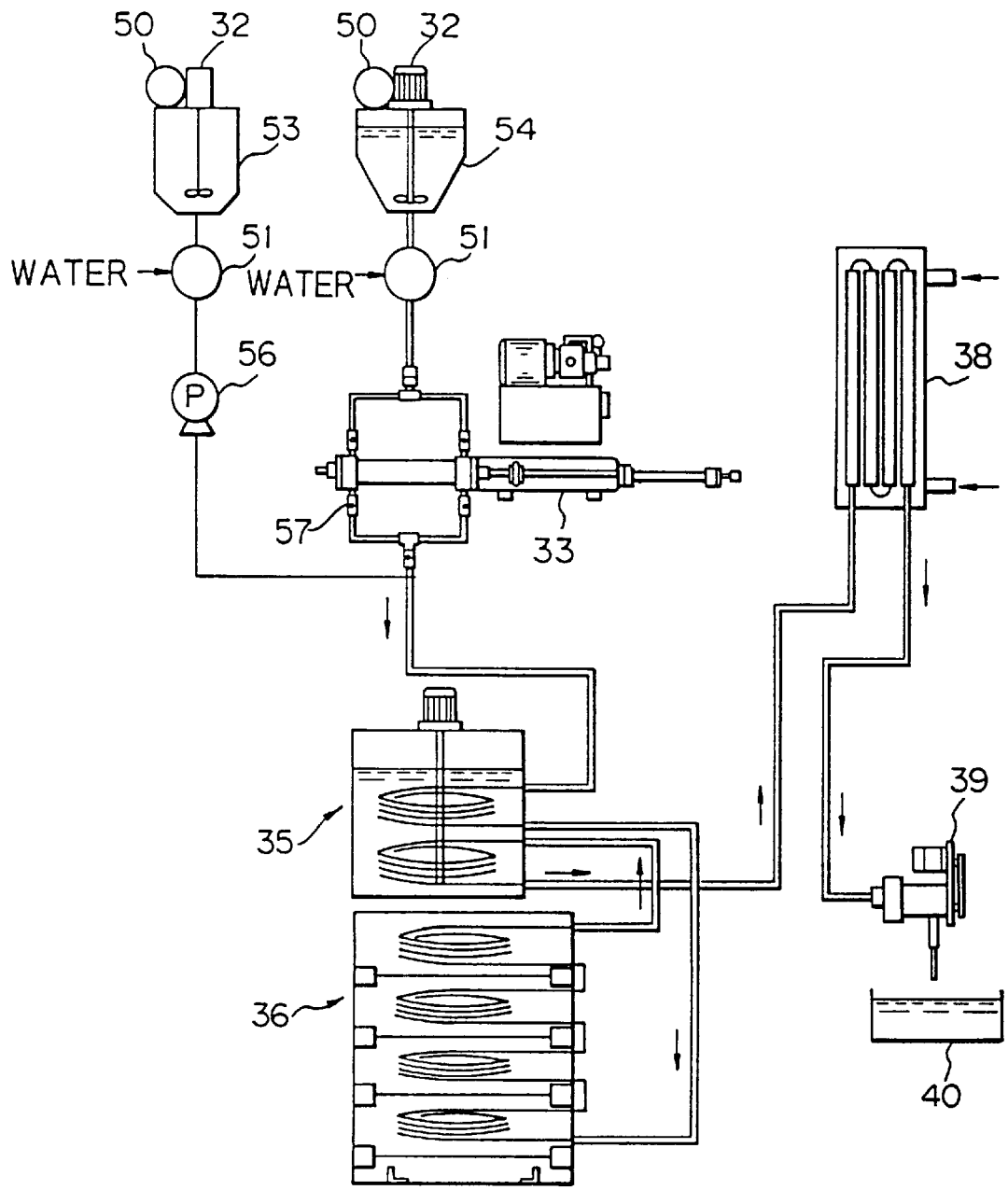
FIG. 4 is a diagrammatic view illustrating one example of the high-pressure treatment apparatus in which feed rates of liquid to be treated, solvent and reaction accelerator may be individually or separately adjusted.

A mixture of plastic and water is supplied into the tank 31. If necessary, the agitation means 32 is used so as to obtain a uniform mixture. Then, the mixture is injected into the reactors by means of the high-pressure injection pump 33. In the illustrated embodiment, plastic powder is dispersed in water so as to form a slurry. The thus formed slurry is supplied from a single tank. It is noted, however, that, in the example shown in FIG. 4, melt plastic and water may be separately contained in a tank 53 having heating means and a container tank 54, respectively, and discharged through pumps 56 and 57, respectively. In such a case, a displacement volume (flow rate) of each of the pumps 56 and 57 may be changed so as to set the mixing ratio at any value. It is also noted that a suitable dispersant, such as a surfactant or a water-soluble high-molecular compound, may be added, in order to facilitate formation of slurry from plastic powder and water.

In the case of admixing melt plastic and water, pressure water should be preheated.

In the reactor unit, the reactors are multi-staged in a vertical direction. It is noted, however, that the reactors may be multi-staged in a horizontal direction.

Figure 5:
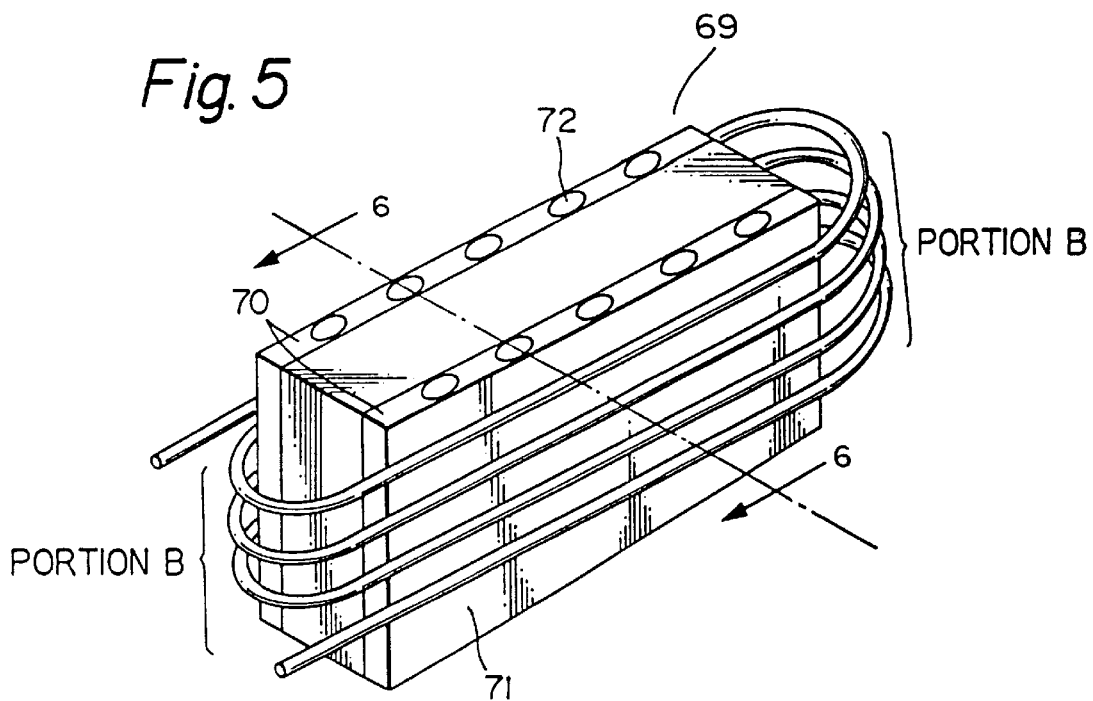
FIG. 5 is a perspective view illustrating one example of a curved or spiral piping to be incorporated into the reactor unit, as well as a heating unit.
Figure 6:
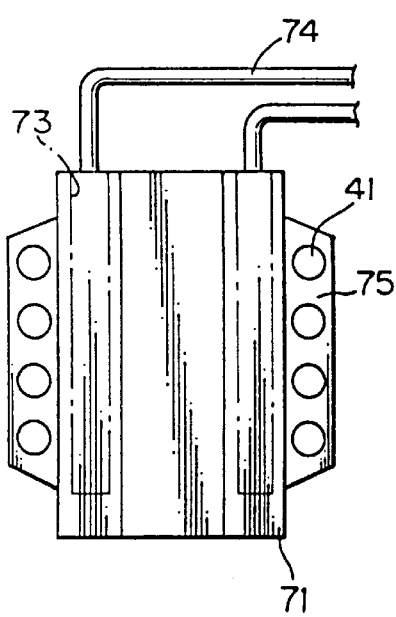
FIG. 6 is a cross-sectional view taken along line A—A of FIG. 7.
Figure 7:
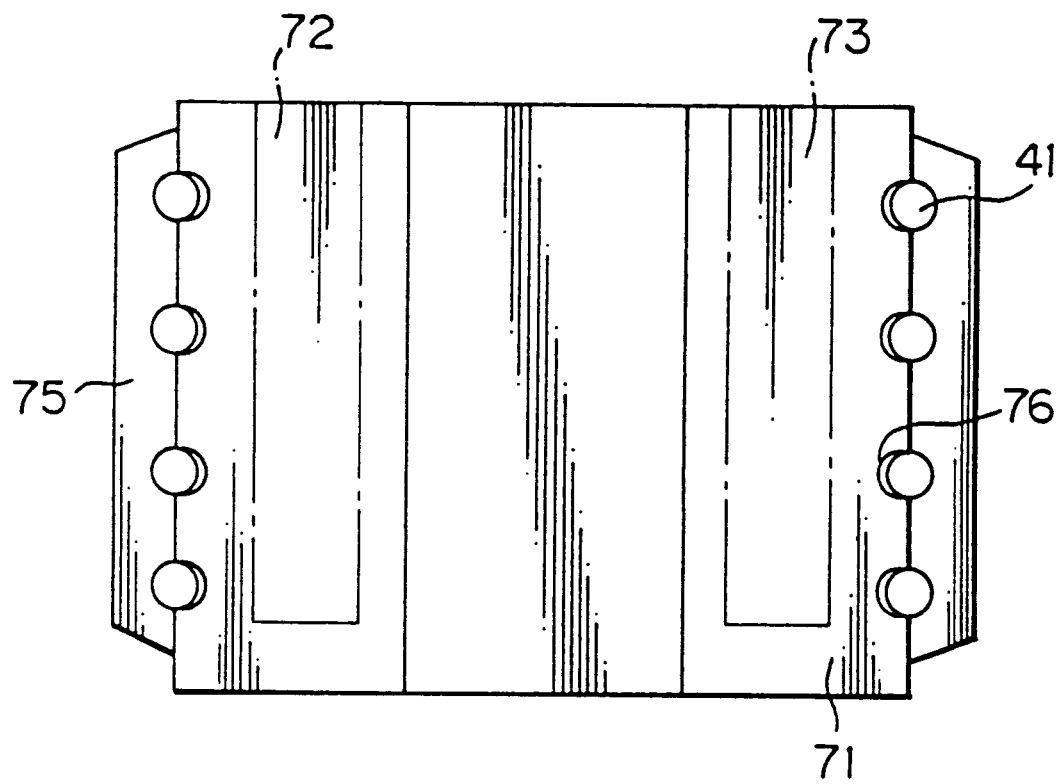
FIG. 7 is a cross-sectional view of a hot plate block of the heating unit provided with channels for piping.
Figure 8:
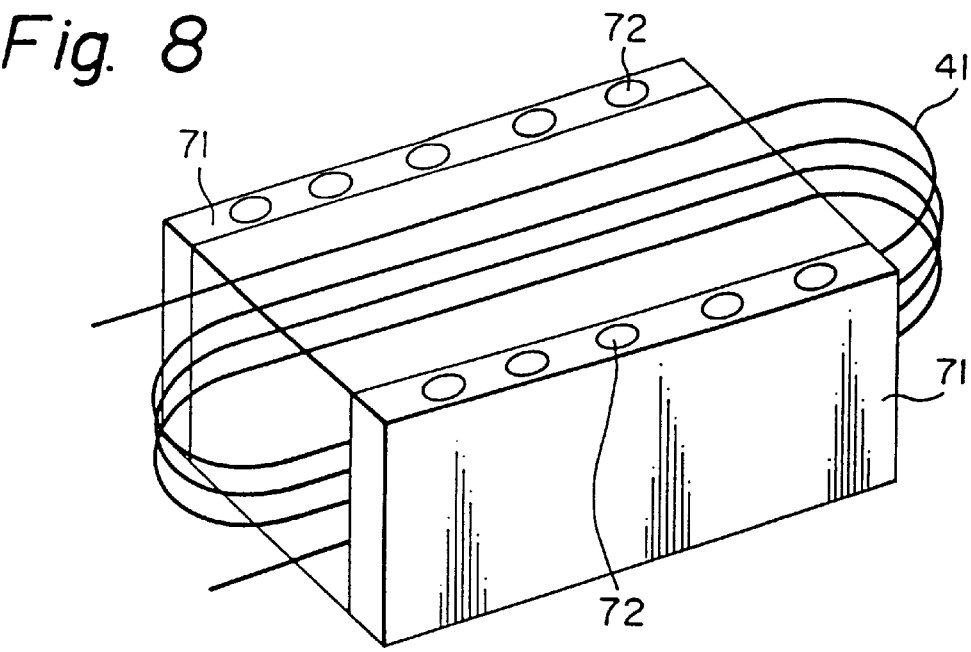
FIG. 8 is a perspective view similar to FIG. 7, illustrating curved piping accommodated within the hot plate block.
Figure 8:
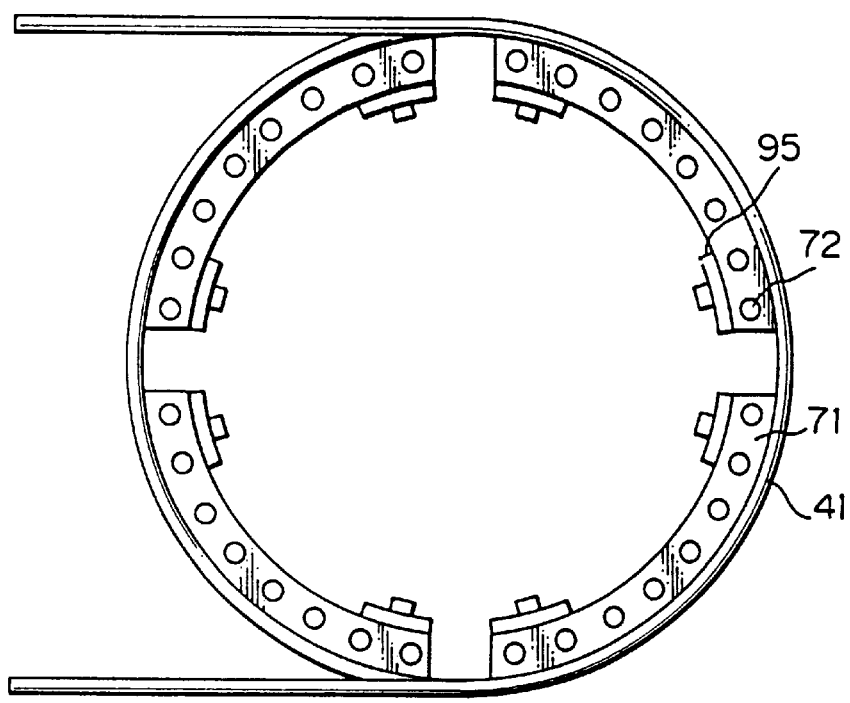
Figure 9:
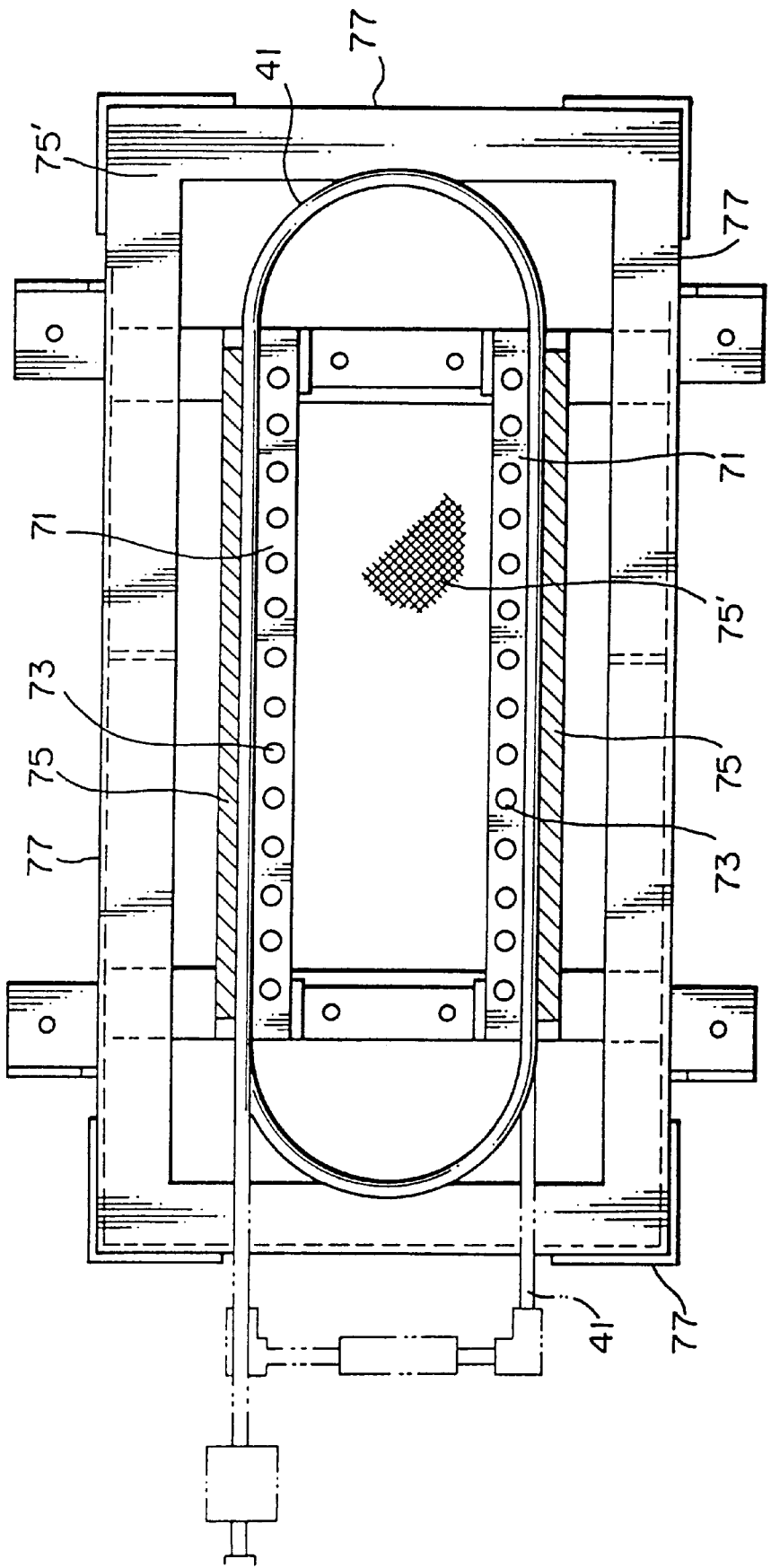
FIG. 9 is a top plan view, partly in section, of the reactor unit.
Figure 11:
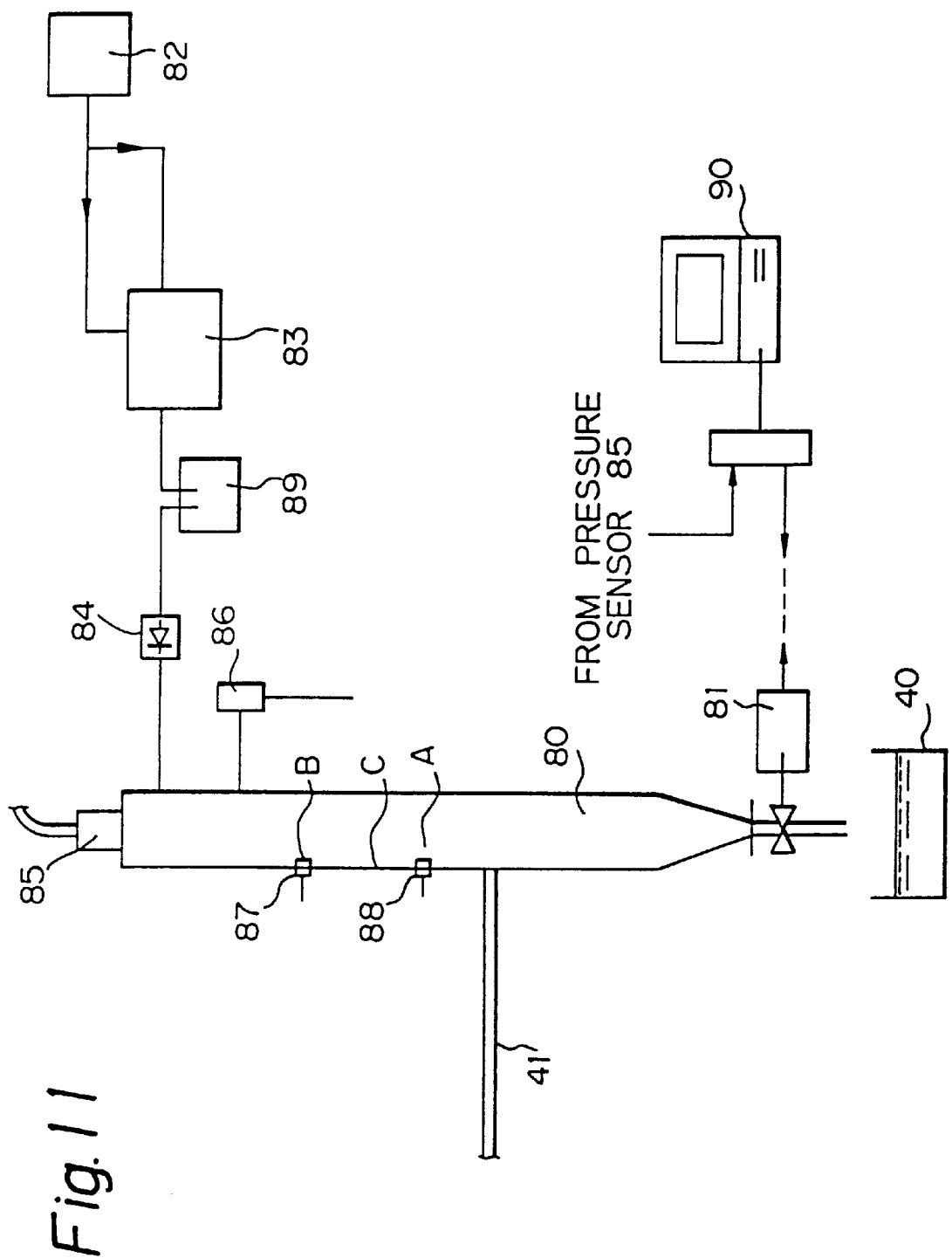
FIG. 11 is an exemplary view of one example of a reactor unit having one end to which a pressure regulation tank is connected.

Each component will be explained below. The main portion (heating unit) 69 of the reactor unit 37 is consisting of a pair of heaters 70 of a plate-like configuration and a piping 41 of a spiral configuration, as shown in FIGS. 5 through 8. The heater 70 shown in FIG. 5 includes, as shown in FIG. 6, a hot plate block 71 of a heat conductive material. The hot plate block 71 is provided with a predetermined number of mount holes 72 for cartridge heaters 73. The cartridge heaters 73 are mounted in respective mount holes 72, thus constituting the heater 80. The hot plate block requires heat receptivity, high heat conductivity, easy workability and the like, and may be formed, for example, from SUH (heat resisting steel) or FCD (ductile iron). In the illustrated embodiment, the hot plate block is formed from FCD (ductile iron). The cartridge heaters 73 may be selected to have a desired heating value per a single cartridge heater. A required number of cartridge heaters arranged in each of the hot plate blocks 81 so as to obtain appropriate heat transfer efficiency relative to the piping 41, as shown in FIG. 5. In FIG. 6, the outer surface of the piping 41 is covered with a layer of a heat conductive material, so as to increase heat efficiency. As shown in FIG. 7, the hot plate block 71 is provided in its side surface with a channel 76 for installation therein the piping 41. By this, the contact area between the hot plate block 71 and the piping 41 is increased, whereby higher heat conductivity may be obtained. As shown in FIG. 8, the curved piping 41 may be accommodated between the pair of hot plate blocks 71. In this case, each of the hot plate blocks may be provided in its inner surface with the channels shown in FIG. 7 for maintaining therein the piping 41. It is necessary for the reactor unit 37 to have a construction capable of absorbing thermal stress since it is heated to a high temperature. It is noted, however, that according to the illustrated construction, stress due to the axial expansion of the piping may be easily absorbed by the curved portions (portions B) which are freely supported. The heating unit is constructed as a reactor unit 38 by filling heat insulating material 75' within the hot plate block, while covering the insulating material with a plate of stainless steel, and providing an inlet piping and an outlet piping as connection portions, as shown in FIG. 11. Rather than the curved piping 41 shown in FIG. 8, it is also possible to use a circular piping 41 and arcuate hot plate blocks as shown in FIG. 8a. The circular piping 41 and the arcuate hot plate blocks are integrated by means of attachment fittings 95. A construction similar to that of the reactor unit 37 consisting of the curved piping 41 shown in FIGS. 8 and 9 may be applicable to the reactor unit consisting of the circular piping 41.

Figure 10:
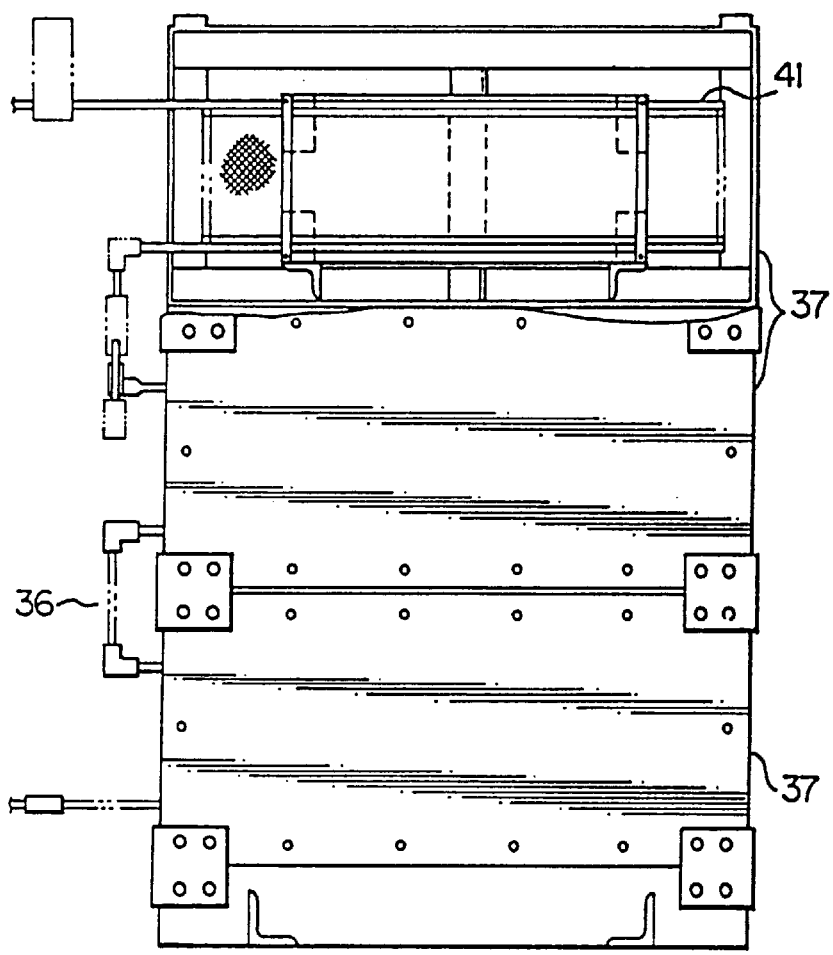
FIG. 10 is a side elevational view, partly in section, of a three-staged reactor unit
Figure 10A:
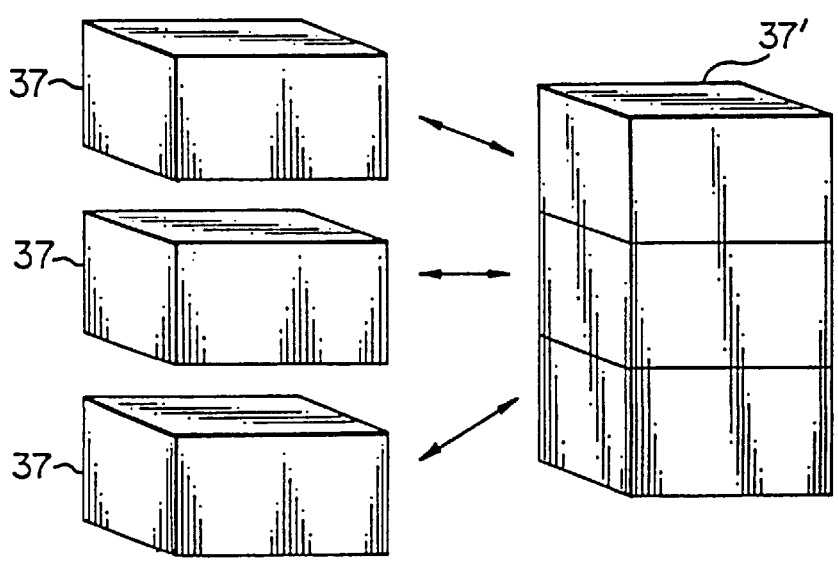
FIG. 10a is a diagrammatic view of reactor units adapted to be accommodated in a cartridge fashion.

The reactor device 36 is constructed by connecting a required number of reactor units 37 in a multi-stage fashion, as shown in FIG. 10. The number of stages (three stages in the drawing) to be connected, or a size of units are determined depending upon treatment capacity (flow rate) and the like, so that optimum reaction conditions, such as reaction time, heating time, temperature gradient, may be obtained. With the multi-staged unit 37, any required number of the units 37 may be heated by means of their heaters, while the cartridge heaters 73 of the remaining units 37 are turned off, whereby thermal efficiency and treatment cost are significantly improved. While each of the reactor units 37 may be fixedly attached relative to one another by means of attachment fittings, it is also possible for each of the reactor units to be installed in a frame body 37' in a cartridge fashion, as shown in FIG. 10a, in order to remove a particular reactor unit(s) 37 for maintenance and replacement thereof.

The heat exchanger 35 is provided for preheating the pressure water, as well as the mixture of plastic and water (the mixture will be referred to as "object liquid" hereinbelow), and for precooling the reaction product. The heat exchanger may be of any conventional construction. Similarly, the pump 33, the cooler 38 and the pressure reducing valve 39 may be of any conventional construction. The water and plastic in the tank 31 for the object liquid are sufficiently admixed with each other by means of the agitation means 32. The thus obtained mixture is supplied through the high-pressure injection pump 33. The object liquid is preheated in the heat exchanger 35 and treated in the reactor device 36. The resulting reaction product is again precooled by means of the heat exchanger 35 and de-pressurized by the pressure reducing valve 39. The treated liquid is then discharged into an effluent tank 40.

The reactor device 36, the heat exchanger 35 and the cooler 38 are connected relative to one another by means of pipings 41 the same as that of the reactor device 36. The thus formed flow passage line is constructed by the pipings 41 of the same diameter, so that highly reliable connection may be easily obtained under high-temperature/high-pressure condition.

One example of the pressure reducing devices for maintaining pressure in the flow passage line at a value within a predetermined range will be explained below with reference to FIG. 11. Set values for each of the devices shown in FIG. 11 are as follows:

booster device 83:
    discharge pressure; 400 kg/square-cm
    discharge volume; 2.5 liters/min.
air compressor 80:
    discharge pressure; 7 kg/square-cm
pressure regulation tank 80:
    pressure resistance; 400 kg/square-cm
pressure switch 84: 240 kg/square-cm
automatic open/close valve 81: adjusted to permit a flow rate of 1.0 liter/min. at the pressure of 250 kg/square-cm A flow of object liquid of 1 liter/min. at 250 kg/square-cm is flown from the reaction piping 41 into the pressure regulation tank 80. Assuming that the liquid level in the pressure regulation tank 80 is at point C, the inflow volume and the discharge volume from the automatic open/close valve 81 are balanced. Thus, the pressure within the regulation tank 80 is not fluctuated and maintained at a constant value.

In the apparatus for converting waste plastic into oil, flow rate may be more or less fluctuated since a plunger pump or a cylinder pump is used. It is noted, however, that such pressure fluctuation may be detected by means of a pressure sensor 85 mounted on the pressure regulation tank 80, so as to control the opening of the automatic open/close valve 81 by means of a control computer 90, whereby substantially no pressure fluctuation is caused. For example, during decomposition of crosslinked polyethylene containing carbon particles, carbon powder is generated in the object liquid, so that the object liquid becomes solid/liquid mixture.

The opening of the automatic open/close valve 81 is adjusted so as to allow a discharge volume of 1 liter/min. at a pressure of 250 kg/square-cm. Since the open area is very small, that the powder tends to be collected in the discharge port, so as to significantly reduce the flow rate, whereby the liquid level is increased. When the pressure exceeds the set pressure of 260 kg/square-cm of the safety valve 86, gas is automatically exhausted from the tank 80, so that the internal pressure within the tank is maintained at a value less than 260 kg/square-cm. At this time, the automatic/close valve 81 is simultaneously controlled so as to obtain an increased opening, so that blockage in the discharge port is released when the opening reaches a predetermined value. Thus, liquid level is quickly decreased, so as to reduce the internal pressure within the tank. It is noted, however, that the pressure switch 84 is automatically actuated when the pressure within the tank is reduced to a value less than 250 kg/square-cm, so that a flow of air at 400 kg/square-cm contained in an air tank 89 is supplied to the tank, whereby the pressure within the pressure regulation tank 80 is maintained at a value less than 240 kg/square-cm. Simultaneously therewith, the automatic open/close valve 81 is controlled by means of the control computer 90 to be closed quickly so as to be returned to its original opening. When the liquid level is lower than the position of a LOW liquid level sensor 88, the automatic open/close valve 81 is further closed slightly. When the liquid level is increased beyond the position A, the automatic open/close valve 81 is returned to its ordinary position. If the liquid level exceeds the position of a HIGH liquid level sensor 87, the automatic open/close valve 81 is slightly opened so as to cause the liquid level to be decreased. When the liquid level decreased to a level beyond the position B, the automatic open/close valve 81 is returned to its ordinary position. The above procedures are repeated so as to maintain the pressure within the pressure regulation tank 80 at a pressure of 240–260 kg/square-cm.

When the object liquid contains a quantity of gas, the pressure within the pressure regulation tank 80 increases gradually. The gas is exhausted out of the tank 80 through the safety valve 86, when the pressure within the tank 80 exceeds 260 kg/square-cm. When a particular gas is considered to be dangerous, nitrogen gas may be used as inlet as to the booster device 83. The pressure switch 84 is automatically actuated, when the pressure within the pressure regulation tank 80 is decreased below a set pressure value, so as to cause air at 400 kg/square-cm contained in an air tank 89 to be supplied into the pressure regulation tank, in order to maintain the pressure within the tank at a constant pressure. At this time, quicker response may be expected when the gas pressure (400 kg/square-cm, in this case) within the air tank 89 is higher than the set pressure value. It is also noted that larger tank capacity provides an increased amount of supplemental air, so that safety property is increased. Larger volume of the pressure regulation tank 80 decreases fluctuation of the pressure within the pressure regulation tank 80 due to the change in opening of the automatic open/close valve 81. Thus, on/off-control for opening of the automatic open/close valve 81 may be performed, when the pressure regulation tank 80 has a larger volume.

As will be appreciated from the foregoing, continuous and safety operation, with substantially no pressure fluctuation as experienced in prior art, may be performed in accordance with the invention, regardless of possible blockage in the automatic open/close valve 81 and gas generation in relation to the treatment reaction.

Figure 13:
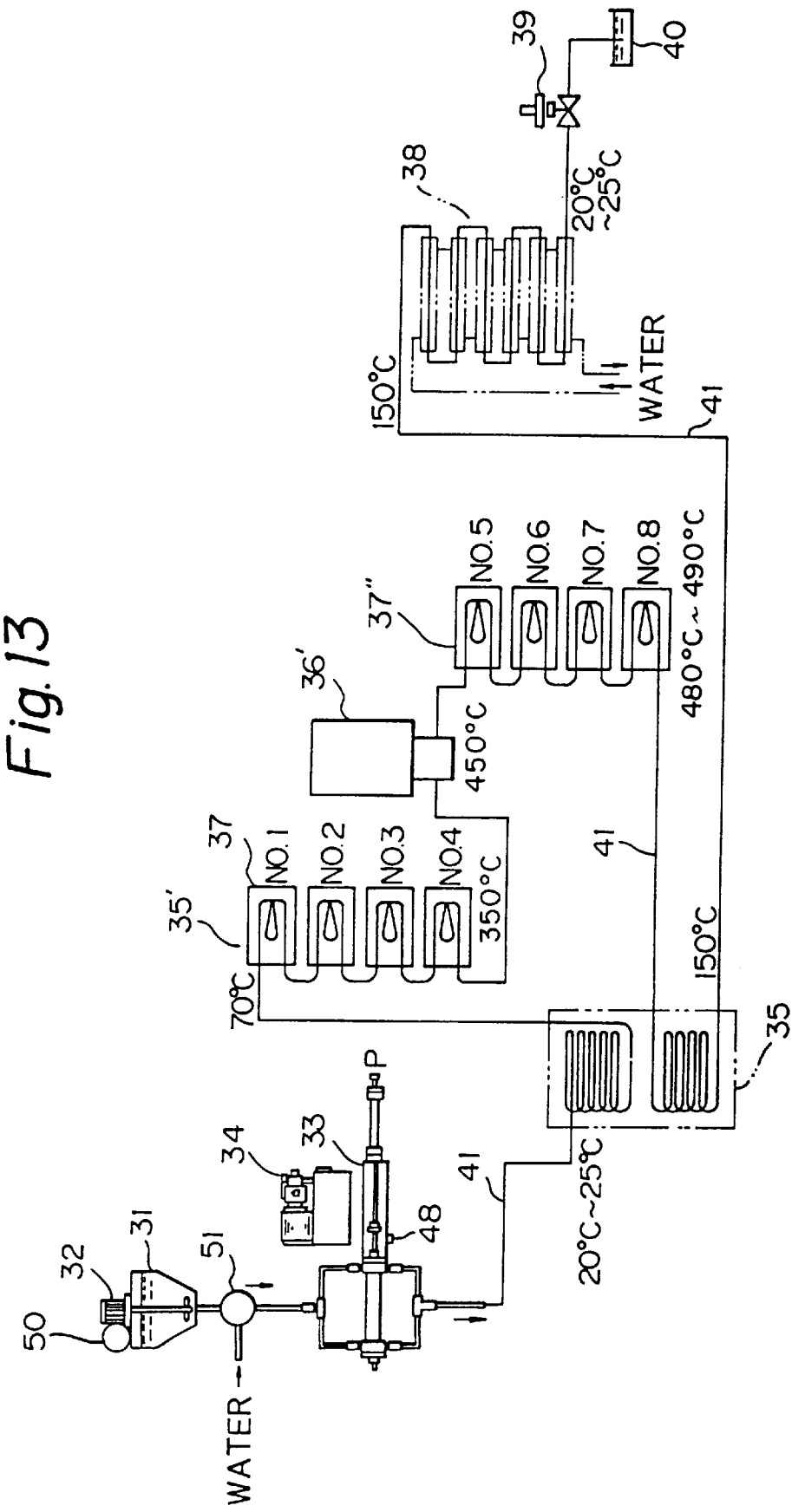
FIG. 13 is a diagrammatic view of one example in which an induction heater is used as a pre-heater.

Further embodiment is illustrated in FIG. 13. Reference numeral 31 denotes a tank with an agitation means 32 for receiving a quantity of object liquid, 33 a high-pressure injection pump, 34 a hydraulic unit, 35 a heat exchanger, 35' a preheater including multi-staged (4 stages in the drawing) reactor units 37, 36' a quick heating means capable of instantaneously increasing the temperature of the solvent to a target value by heating the piping, for example, by means of an induction heater, 37" a warmer for maintaining the temperature of the solvent having been increased in its temperature by means of the quick heating means 36', 38 a cooler, 39 a pressure reducing valve, and 40 a tank for receiving a quantity of treated liquid. In this case, the preheater 35', the quick heater 36' and the warmer 37" constitute the reactor device 36.

When it is desired to instantaneously increase the temperature of the object liquid to a target value, the induction heater 36' may be used. In the induction heating, a quick heating at a rate of 100° C./min. or more is possible, by means of magnetic hysteresis loss and eddy current. By employing induction heating, it is possible for the solvent to be instantaneously heated to about 200° C. or more by heating the piping of a length of merely one meter by means of the induction heater. The induction heating is advantageous since it is possible to instantaneously obtain a set temperature (target temperature) and to easily control the reaction phenomenon. Since thermal time constant is extremely small, temperature control may be easily performed. The construction may be significantly simplified. Since the solvent within the piping may be instantaneously heated to a target value, less length of the piping is required to be heated.

Figure 14:
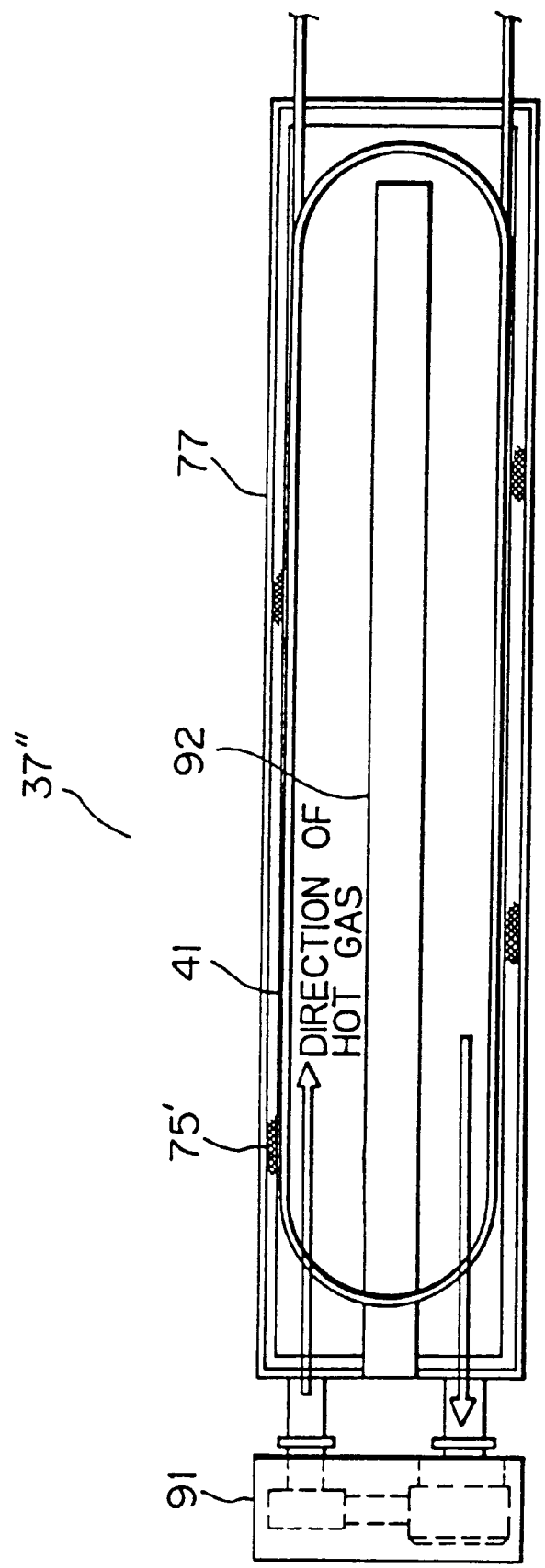
FIG. 14 is a schematic view illustrating one example of a warmer using hot gas.

When it is desired to set the reaction temperature at 500° C., the object liquid is heated to about 350° C. by means of the preheater 35', as shown in FIG. 13. Then, the object liquid is instantaneously heated to a set temperature value by means of the quick heating means 36'. Thereafter, the object liquid is maintained at the set temperature value for a predetermined period of reaction time. Thus, a predetermined reaction temperature may be maintained for a predetermined period of reaction time substantially by means of simple thermal insulation (slight heating is required). In order to perform thermal insulation, a construction similar to that of the reactor unit 37 may be employed. It is noted, however, that thermal insulation/heating system in which air is circulated using a hot gas generator as shown in FIG. 14 may be used, instead of the construction similar to that of the reactor unit 37. It is also noted that high-temperature gas obtained from the combustion of fuel gas or heavy oil may be utilized. A warmer 37" may be constructed by a hot gas generator 91, insulting material 75', and partition plate 92. The insulating material 75' and the partition plate 92 are enclosed for example by a plate 77 of stainless steel. The warmer 37" is of a very simple construction, so that maintenance work such as replacement of parts may be easily performed. It is also noted that temperature control may be easily performed since thermal time constant is small. Usually air is used as hot gas. It is noted, however, than any gases other than air which is superior in terms of specific heat and heat conductivity. The preheater may be eliminated depending upon a reaction temperature and a design condition of the induction heater. In the case of utilizing hot gas as a heating means, the curved piping may be designed to have a desired configuration, so as to obtain an increased thermal efficiency.

A plunger pump or cylinder pump may be used as the high-pressure injection pump. An embodiment for maintenance (compensation) of the pressure using a cylinder pump as the high-pressure pump will be explained below. It is true that a cylinder pump may be used as the high-pressure injection pump 33, the cylinder pump temporarily produces a decreased pressure when the cylinder is returned at opposite ends. For example, depending upon a given displacement velocity of the cylinder, the output pressure or discharge pressure of 250 kg/square-cm from the cylinder pump may be reduced by the amount of 5 kg/square-cm to 100 kg/square-cm, when the cylinder pump is returned at the opposite ends.

Figure 15:
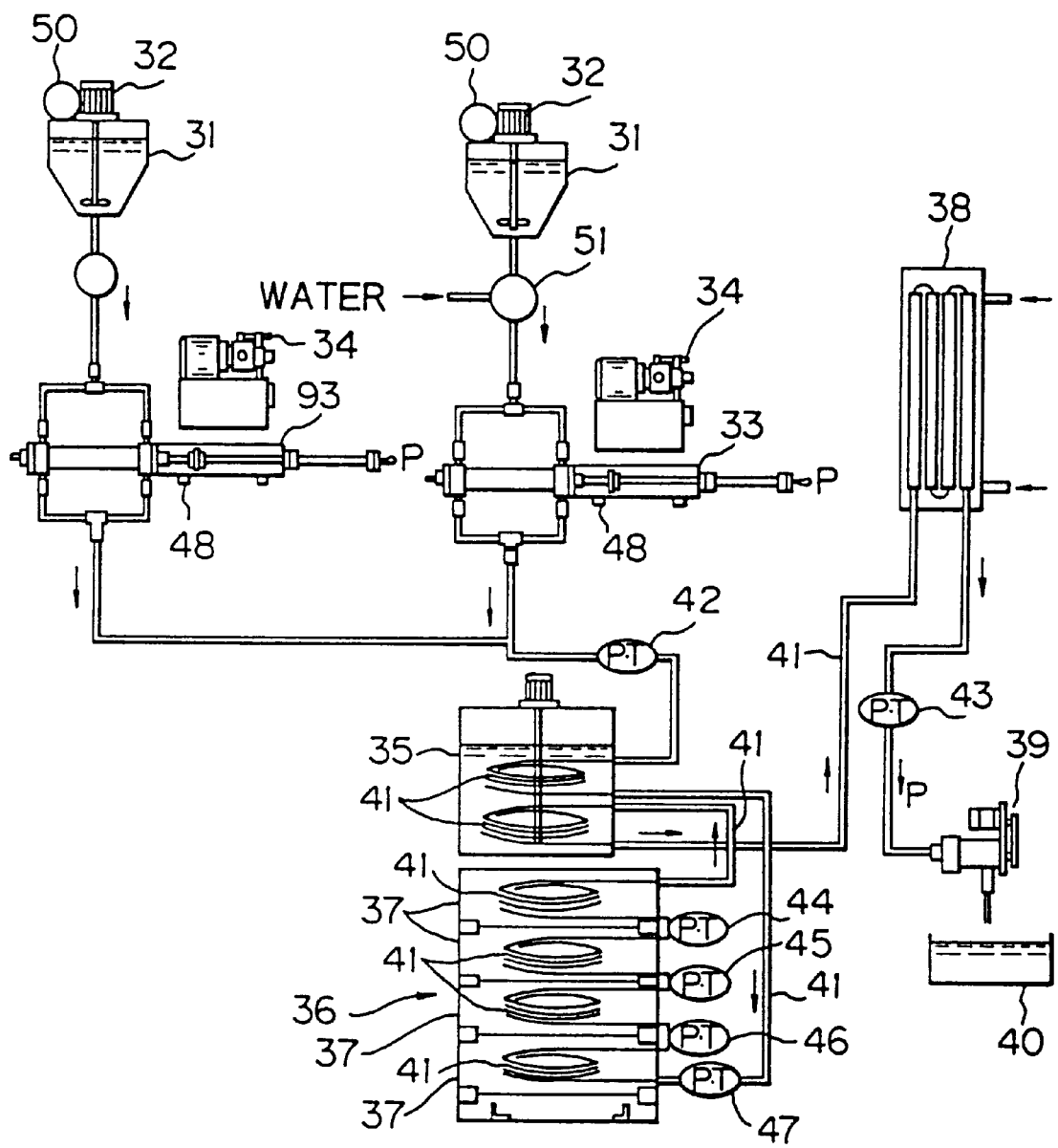
FIG. 15 is a diagrammatic view illustrating another embodiment of the invention employing pressure compensation means.

The pressure decrease, caused when the cylinder is returned at the end, may be prevented by injecting a quantity of object liquid by means of a pressure compensation means 94. FIG. 15 is an illustrative view showing another embodiment of a pressure compensation system of the invention. The high-pressure injection pump 33 is adapted to have a constant displacement speed regardless of a given pressure, so as to supply a constant volume of object liquid into the piping. A compensation pump 93 for injecting a quantity of object liquid is actuated when the pressure within the piping is decreased below a set value, for the purpose of compensation of the decreased pressure. Thus, the compensation pump is not actuated when the cylinder of the high-pressure injection pump 33 is not at the opposite ends.

Assuming that the displacement speed of the cylinder of the high-pressure injection pump 33 and the opening of the pressure reducing valve are adjusted, so as to permit a flow of object liquid at 1.0 liter/min. under the pressure of 250 kg/square-cm.

When the cylinder of the high-pressure pump 33 is returned at one end, the pressure within the piping is decreased. The decrease in pressure is detected by the pressure sensor 42. If it is intended to prevent such pressure decrease by reducing the opening of the pressure reducing valve 39, appropriate adjustment for the opening of the pressure reducing valve 39 could not be performed, since such pressure decrease in the piping is caused instantaneously. Rather, the opening is excessively decreased, so as to quickly increase the pressure, thus advantageously causing the pressure to be fluctuated to a substantial degree.

On the contrary, when the pressure compensation pump 93 is actuated simultaneously with the detection of a pressure decrease by means of the pressure sensor 42, so as to supply a quantity of object liquid corresponding to the pressure decrease, no pressure fluctuation is caused at either end of the pump.

Thus, it is possible to perform a stable supercritical water reaction without pressure fluctuation, when the cylinder of the pressure compensation pump 93 is actuated simultaneously with the detection of pressure decrease at the opposite ends of the cylinder pump by means of the pressure sensor 42, for the purpose of compensation of the pressure decrease.

The reaction piping of the high-pressure treatment apparatus may be of a double-tube construction including an inner tube and an outer tube, in order to prevent the content within the piping from being exhausted when the reaction piping is damaged. It is noted, however, that, with such a simple double-tube construction, the thermal time constant of the reactor portion becomes significantly larger, so that the temperature of the reaction portion will be increased. Thus, a quantity of water is supplied into a space between the outer and inner tubes of the double-tube construction by means of a high-pressure pump, simultaneously with detection of pressure decrease, for example, due to the damage of the reaction piping. By this, it is possible for the temperature of the reaction device to be decreased, as well as preventing leakage of the object material to be decomposed within the reaction piping. The extent of the flow passage over which the double-tube construction is provided may be selectively determined depending upon certain condition, such as the construction of the apparatus and the type of the object material to be decomposed.

An example for decomposing crosslinked polyethylene by means of the apparatus for converting plastic into oil according to the invention will be explained with reference to FIG. 3.

The piping 41 of the reactor unit 37 is constituted by a stainless (SUS 316) pipe having an inner diameter of 6 mm and an outer diameter of 10 mm. The stainless pipe is wound into a spiral configuration to form four stages of spiral pipings. A cylinder pump is used as the high-pressure injection pump 33.

A crosslinked polyethylene resin used as cable sheathing is added with carbon particles, in order to increase its weather-resistance property. 500 gr. of crosslinked polyethylene powder ground to a particle size equal to or below 0.5 mm was admixed with a 50 liter of water, as a solvent, in the object liquid tank 31. The flow rate was set at 0.85 liter/min. to 1.7 liter/min., so as to obtain a turbulent condition under which the powder and water are sufficiently agitated in the reactor for an appropriate reaction time. The turbulent condition is established if the Reynolds' number expressed by the following equation is 2300 or more:

$$Re = Du/v$$

where D is the diameter of a pipe; u is the flow velocity of a fluid (m/s), and v is its kinematic viscosity (m$^2$/S).

A quantity of water is supplied into the high-pressure injection pump 33 through a flow passage change-over valve 51. Thus, the water is supplied into the reaction device 36 through the heat exchanger 35 at the rate of 1 liter/min. under 250 kg/square-cm. The flow rate was controlled by means of the opening of the pressure reducing valve 39, and the pressure was remotely controlled by regulating the output pressure from the high-pressure injection pump 33 through the control panel and the control computer. Then, the temperature of each of the reactor units 37 of the reaction device 36 was set at a predetermined value. After confirming that each of the units 38 reached at the predetermined value, the passage change-over valve 51 was changed to be connected with the passage from the tank 31. The object liquid was supplied in a manner similar to that mentioned above. The fluid (object liquid) containing the object material to be decomposed has passed the reaction device 36 within a short time of period of about two minutes or less. The object liquid then passed through the heat exchanger 35 and the cooler 38. The object liquid was reduced in its pressure by the reducing valve 39 and discharged, as water, cracked oil and cracked gas, into the tank 40 for receiving treated liquid. When crosslinked polyethylene is decomposed under the above condition, carbon particles will be precipitated. When decomposition is performed under a turbulent condition, efficient decomposition reaction is obtained. Furthermore, the carbon particles are flown into the pressure reducing valve 39 in a completely and uniformly admixed state, so that there is no risk of causing blockage in the piping 41. On the contrary, if the decomposition reaction is proceeded under a laminar flow condition, rather than a turbulent flow condition, the carbon particles precipitated during the decomposition reaction, together with the fluid, would be flown into the pressure reducing valve in an insufficiently admixed state. Thus, it is likely to cause a problem of blockage within the piping 41. It is also expected that the carbon particles in a massive state are flown into the pressure reducing valve so as to cause the problem of blockage in the pressure reducing valve 39. It is also expected that another constituent, other than carbon particles, in the cracked oil, which have been caused during decomposition of plastic and which have a high boiling temperature, may be precipitated in the piping. Occurrence of blockage, due to such constituents having a high boiling point, may be prevented by performing the decomposition reaction under a turbulent condition.

An experiment for decomposing crosslinked polyethylene resin was conducted. In this experiment, each reactor unit was kept at a constant temperature of 490° C., and the flow rate was set at 0.85 liter/min. and 1.7 liter/min. Since the time required for the object liquid to pass through the reactor units depends on the flow rate, the reaction time was 2 min. for the flow rate of 0.85 liter/min. and 1 min. for 1.7 liter/min.

From this experiment, it was found that crosslinked polyethylene was decomposed within a very short reaction time of the order of a few minutes into oily material. The analytical result for the constituent of the oily material obtained is shown in FIG. 12-A.

Figure 12A:
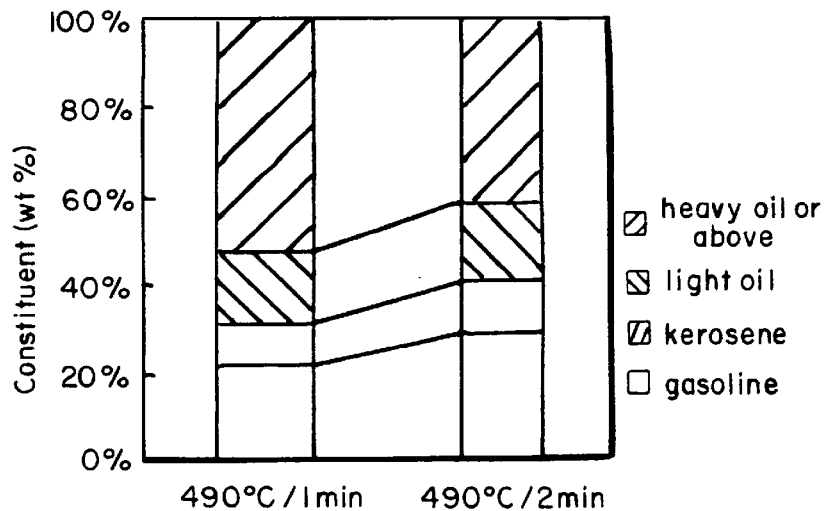
FIGS. 12-A and 12-B are graphs showing constituents of oil materials obtained from decomposition reaction.
Figure 12B:
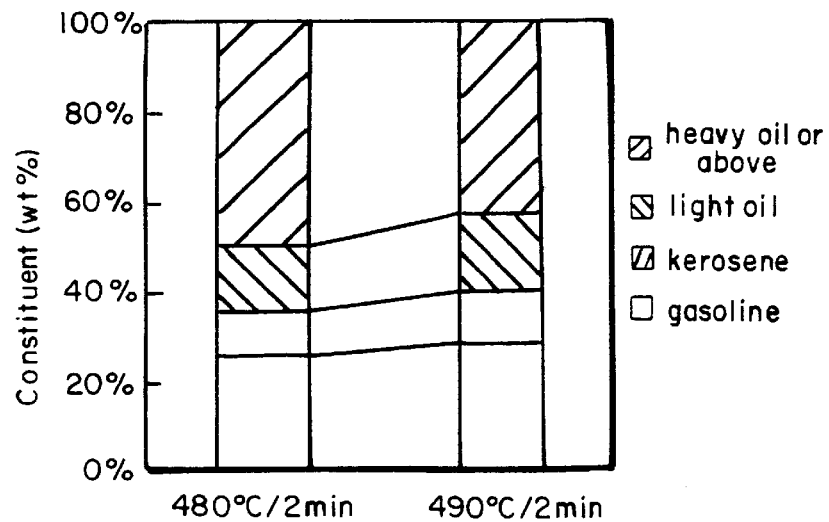
Figure 12C:
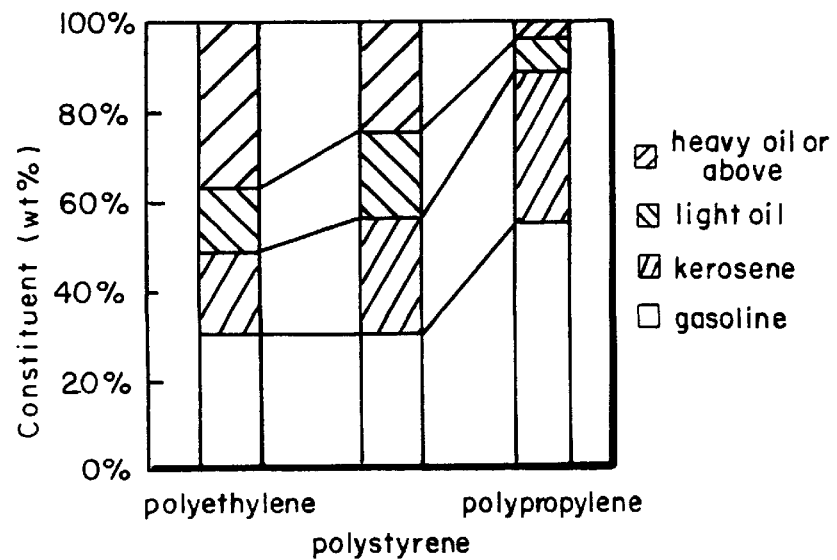

FIG. 12-A shows that the oily material includes a gasoline fraction to a heavy oil fraction. It is also found that, since the constituent varies depending upon a given reaction time, it is possible to control the constituent of an oily material obtained from the decomposition by changing the reaction time. It is also found that crosslinked polyethylene may be decomposed to an oily material at a very high efficiency, i.e., the yield of crosslinked polyethylene input being about 89% at the reaction time of 1 min., and about 85% at the reaction time of 2 mins.

FIG. 12-B shows an analytical result for the constituent of oil material obtained from an experiment in which a constant reaction time of 2 mins. (flow rate=0.85 liter/min.), and reaction temperatures of 480° C. were employed.

The result shows that the constituent of an oily material varies in accordance with a given reaction temperature. Thus, it is found that it is also possible to control the constituent of an oily material obtained from decomposition by changing the reaction temperature. It is also found that yield of cracked oil from polyethylene input is very high, i.e., about 90% at the reaction temperature of 480° C., and about 85% at the reaction temperature of 490° C.

From the foregoing, it will be appreciated that it is possible to control the constituent of oily material by desirably changing the reaction time and reaction temperature in the apparatus of the invention, and to recover oil material at a very high yield.

Next, kinds of plastics, i.e., non-crosslinked polyethylene resin, polystyrene resin and polypropylene resin, were studied.

A 500 g of each particle size equal to or less than 0.5 mm and 50 liters of water, as a solvent, were admixed in the object liquid tank 31. The flow rate was set at 0.85 liter/min. (reaction time=2 mins.), so as to obtain a turbulent condition whereby a sufficient stirring action may be realized in the reactor. Each reactor unit is set at a temperature of 490° C.

The result is shown in FIG. 12-C. This figure shows that the above-mentioned plastics may be converted into oil. It is noted, however, the constituent of the resulted oil materials vary depending upon the kinds of plastics. It is also found that oily materials may be obtained at a very high efficiency, i.e., the yield of cracked oil being about 85% of the input non-crosslinked polyethylene resin, about 98% of the input polystyrene resin, and about 80% of the input polypropylene resin.

The constituent of the oily materials may be controlled by employing appropriate reaction time and reaction temperature, as mentioned above.

Next, a test result of a decomposition experiment for non-crosslinked polyethylene resin using the apparatus shown in FIG. 13 will be explained. The reactor device 36 is constructed by a preheater 35' including reactor units 37 having a piping length of 70 m, an induction heater 36' having a quick-temperature-rising property and including a straight piping of 1 m of a material, an inner diameter and an outer diameter the same as those of the piping 41 of the reactor units 37, and a warmer 37" having a piping of 100 m of a construction the same as that of the reactor units 37. Thus, the overall length of the reactor device is about 170 m as measured from the preheater 35' through the induction heater 36' to the warmer 37".

A flow of water was supplied through the flow passage change-over valve 51 into the high-pressure injection pump 33. The flow of water, under the pressure of 250 kg/square-cm, was supplied, at the flow rate of 1.4 liter/min., through the heat-exchanger to the reactor device 36. The flow rate and the injection pressure were adjusted by remote-controlling the opening of the pressure reducing valve 39 and the displacement pressure of the high-pressure injection pump 33, respectively, from a control panel and a control computer. Then, the preheater 35' of the reactor device was set at a temperature of 35° C., the induction heater 36' was set at a temperature of 450° C., and the warmer 37" was set at a temperature of 490° C. When the set temperature of each unit has been achieved, the flow passage change-over valve 51 was changed to the flow passage of the object liquid, so as to cause a 1.4 liter/min. of object liquid to be injected. The reaction time in this case was 2 mins. during which the object liquid may pass through the warmer.

A 500 gr of polyethylene resin powder finely ground to a particle size equal to or less than 0.5 mm and a 50 liter of water, as a reaction solvent, were directed into the object liquid tank and sufficiently admixed using the agitator 32, so as to cause the polyethylene resin powder to be evenly dispersed into the water to form a slurry. It is noted that additives, such as dispersant, may be advantageously used, in order to obtain a stable slurry consisting of water and polyethylene resin powder. A dispersant conventionally used in preparing CWM in which fine coal powder and water are admixed together may be used. Another type of dispersant may also be used.

The fluid containing the material to be decomposed is directed in the heat exchanger 35 and contacted in heat-exchanging relationship with the treated liquid, which has completed the decomposition reaction. Thus, the fluid containing the material to be decomposed is preheated to a temperature of 350° C. It is noted that the rate of the decomposition reaction of polyethylene resin powder at the reaction temperature of 425° C. is relatively low, so that a reaction time more than 90 mins. is required. On the other hand, the decomposition reaction at the reaction temperature above 480° C. will be completed within a few minutes, it is necessary for the object liquid to be instantaneously increased in its temperature to a target reaction temperature, in order to determine an accurate reaction time. Thus, the decomposition reaction in the preheater according to the illustrated embodiment may be disregarded.

The fluid containing the material to be decomposed was instantaneously increased in its temperature by the induction heater 36' to the temperature of 450° C., and then increased in its temperature by the warmer 37" to the set temperature of 490° C. The fluid passed through the warmer 37" within about 2 mins. Polyethylene resin powder was decomposed in the supercritical water. The resultant reaction product was cooled by means of the heat exchanger 35 and the cooler 35. The reaction product was reduced in its pressure by means of the pressure reducing valve 39, and then discharged into the effluent tank 40 in the form of cracked oil and cracked gas. The yield of the cracked oil was very high. Specifically, about 85% of the input polyethylene resin was converted into oil material. The constituent of the oil material was similar to that mentioned above. It is noted that water-soluble products, such as acetic acid, which have been formed during the decomposition reaction of the polyethylene resin powder, may exist in the water having been discharged into the effluent tank. Thus, it is not possible for such water to be disposed of without performing any further treatments. In this connection, an experiment was conducted in which the water in the effluent tank was recycled as a reaction solvent. This experiment showed a substantially the same result as that of the above-mentioned experiment. That is to say, polyethylene resin powder has been successfully converted into oil. Accordingly, it is possible for the water in the effluent tank to be advantageously recycled.

In the example shown in FIG. 13, plastic is finely ground and supplied to the reactor device as a water slurry. It is noted, however, that, when the plastic to be treated is capable of being heated to melt plastic, such plastic may be directed into the receiver tank 53 (FIG. 4) having a heating means for melting plastic. The equipment from the receiver tank to the reactor units is heated to and maintained at a temperature which does not cause solidification of the plastic. A flow of water, as a reaction solvent, is also preheated by means of the heat exchanger 35 and the like prior to its admixing with the melt plastic. The thus preheated water is admixed with the melt plastic and injected into the reactor units, whereby the conversion of the plastic into oil may be performed.

In the embodiment shown in FIG. 13, the preheater 35', the induction heater 36" and the warmer 37" are connected in series to form an entire piping length of about 170 m. It is noted, however, that the above components may be used singly or in desired combination.

The invention permits plastic materials to be decomposed in supercritical water within a short time period, such as a few minutes. Although an appropriate decomposition temperature for plastics varies depending upon the kind of plastics, it is possible to desirably change the decomposition temperature for polyethylene, polypropylene, polystyrene, methacrylic resin, polyester, polyethylene terephthalate and the like, so that they may be decomposed.

It is also noted that the method and apparatus of the invention may be equally applied to decomposition of coal, heavy oil, rubber, or organic chlorine compounds which are difficult to be decomposed, such as freon, other than plastics.

As will be appreciated from the foregoing, the present invention provides an apparatus for converting waste plastic into oil, which realizes a continuous and efficient decomposition reaction by means of a supercritical water reaction, which maintains a smooth transfer of treated material in a solid/liquid/gas mixture, which operates in a highly reliable and stable manner, and which is applicable to a wide variety of materials to be treated.

What is claimed is:

1. An apparatus for converting waste plastic into oil, comprising:

a receiver tank for containing therein a mixture of plastic and water;

a high-pressure injection pump in communication with the receiver tank through a flow passage change-over valve, the flow passage change-over valve being in communication with a water injection passage;

a reactor device including a curved piping in communication with the injection pump, the curved piping being provided with a heating means; and an effluent tank in communication with the reactor device through a pressure reducing valve, wherein the mixture can be injected into the reactor device by means of the injection pump, wherein the flow rate of the mixture to be injected into the reaction device may be controlled by regulating the pressure reducing valve, and wherein thermal decomposition of the mixture is performed in the reactor device, said apparatus characterized in that: said flow passage change-over valve is communicated with said water injection passage, so as to allow a flow of water to be injected into said reactor device, while maintaining the pressure of the water at or above a value by which a supercritical condition is achieved; the water is heated, by means of said reactor device, to a temperature equal to or above a value by which a supercritical condition is achieved; then, said container tank and said high-pressure injection pump are communicated with each other by appropriately changing said flow passage change-over valve; the mixture is injected into said reactor device, while maintaining a pressure condition by which a supercritical condition of the water is achieved; the water is heated, by means of said reactor device, to a temperature equal to or above a value by which a supercritical condition of the water is achieved; the mixture is passed, under a turbulent condition, into said piping by regulating said pressure reducing valve, so as to cause the plastic to be decomposed; and the resultant reaction product is discharged through said pressure reducing valve into said effluent tank, for the collection of gaseous materials, oily materials and water.

2. An apparatus for converting waste plastic into oil according to claim 1, wherein said reactor device including a curved piping is constituted by a plurality of reactor units (37) connected to one another, said reactor units including unified heating means which may be controlled independently relative to one another.

3. An apparatus for converting waste plastic into oil, comprising:

an object liquid receiver tank (31) for containing therein a mixture of plastic and water;

a high-pressure injection pump (33) in communication with said receiver tank through a flow passage change-over valve (51), the flow passage change-over valve being in communication with a water injection passage;

a preheater (35') including a curved piping in communication with the high-pressure injection pump;

a reactor device (36) including a quick heating means (36') and a warmer means (37") having a curved piping; and an effluent tank (40) in communication with the reactor device through a pressure reducing valve (39), wherein the mixture is injected into the reactor device by means of the high-pressure injection pump; wherein the flow rate of the mixture to be injected is controlled by regulating the pressure regulating valve; and wherein thermal decomposition of the mixture is performed in the reaction device, characterized in that: said flow passage change-over valve is communicated with said water injection passage, so as to cause the water to be injected into said reactor device, while maintaining the water at a pressure equal to or above a value by which a supercritical condition is achieved; the water is heated, by means of said pre-heater, to a temperature around a value by which a supercritical condition of the water is achieved; the water is quickly heated, by means of said quick heating means, to a temperature equal to or above a value by which a supercritical condition is achieved; the water is maintained at said temperature by means of said warmer means; said receiver tank and said high-pressure injection pump are in communication with each other by appropriately changing said flow passage change-over valve; the mixture is injected into said reactor device, while maintaining the mixture at a pressure equal to or above a value by which a supercritical condition of the water is achieved; the mixture having been injected into said reactor device, like the injected water, is preheated, by means of said preheating means, said quick heating means and said warmer means, to a temperature around a value by which a supercritical condition is achieved; the mixture is quickly heated to a temperature equal to or above a value by which a supercritical condition is achieved; the mixture is maintained at said temperature by means of said warmer means; the mixture is passed, under a turbulent condition, into said piping by regulating said pressure reducing valve, so as to cause the plastic to be decomposed; and the resultant reaction product is discharged through said pressure reducing valve into said effluent tank, for the collection of gaseous materials, oil materials and water.

4. An apparatus for converting waste plastic into oil according to claim 1 or 2, wherein said mixture of plastic and water is a slurry consisting of plastic powder and water.

5. An apparatus for converting waste plastic into oil according to claim 1 or 2, wherein said mixture of plastic and water is a mixture of melt plastic and water.

6. An apparatus for converting waste plastic into oil according to claim 1 or 2, comprising a receiver tank (53) having a heating means for holding melt plastic therein, and a receiver tank for containing water therein, wherein said receiver is in communication with said reactor device through a high-pressure injection pump.

7. An apparatus for converting waste plastic into oil according to claim 3, wherein said preheater, said warmer or said reactor device including a curved piping is constituted by a plurality of reactor units (37) connected to one another, said reactor units including unified heating means which may be controlled independently relative to one another.

8. An apparatus for converting waste plastic into oil according to claim 2, wherein said quick heating means is an induction heater disposed in a piping by which said preheater and said warmer means are in communication with each other.

9. A method for converting waste plastic into oil, comprising:

(a) containing a mixture of plastic and water in an object liquid receiving tank (31), (b) injecting the mixture through a flow passage change-over valve (51) into a reactor device (36) by means of a high pressure injection pump (33) and through a preheater comprising curved piping (35'), wherein:

(i) the flow passage change-over valve is in communication with a water injection passage through which additional water is injected into the mixture so as to maintain the mixture at a pressure equal to or above a value which a supercritical condition of the water in the mixture is achieved, (ii) the water in the mixture is heated by means of the preheater to a temperature around a value by which a supercritical condition of the water is achieved, said temperature being maintained by warmer means while the object liquid receiving tank and the high pressure injection pump are in communication with each other by appropriately changing the flow passage through the flow passage change-over valve, and (iii) the reactor device comprises curved piping, quick heating means (36'), and warmer means (37"), and is in communication with an effluent tank (40) through a pressure reducing valve (39), (c) maintaining the mixture at a pressure equal to or above a value at which a supercritical condition is achieved by controlling the flow rate of the injected mixture through the apparatus by regulating the pressure reducing valve so that thermal decomposition of the mixture is performed in the reaction device, and (d) collecting the resulting reaction products of gaseous material, oil material and water through the pressure reducing valve into the effluent tank.

* * * * *